(12) United States Patent
Nakae et al.

(10) Patent No.: US 9,450,863 B2
(45) Date of Patent: Sep. 20, 2016

(54) ROUTE REQUEST MEDIATION APPARATUS, CONTROL APPARATUS, ROUTE REQUEST MEDIATION METHOD AND PROGRAM

(71) Applicant: NEC Corporation, Minato-ku, Tokyo (JP)

(72) Inventors: Masayuki Nakae, Tokyo (JP); Masaya Yamagata, Tokyo (JP); Takayuki Sasaki, Tokyo (JP); Yoichiro Morita, Tokyo (JP); Hideyuki Shimonishi, Tokyo (JP); Kentaro Sonoda, Tokyo (JP); Yoichi Hatano, Tokyo (JP)

(73) Assignee: NEC CORPORATION, Tokyo (JP)

(*) Notice: Subject to any disclaimer, the term of this patent is extended or adjusted under 35 U.S.C. 154(b) by 38 days.

(21) Appl. No.: 14/383,621

(22) PCT Filed: Mar. 7, 2013

(86) PCT No.: PCT/JP2013/056236
§ 371 (c)(1),
(2) Date: Sep. 8, 2014

(87) PCT Pub. No.: WO2013/133355
PCT Pub. Date: Sep. 12, 2013

(65) Prior Publication Data
US 2015/0049766 A1    Feb. 19, 2015

(30) Foreign Application Priority Data
Mar. 8, 2012  (JP) .................................. 2012-051117

(51) Int. Cl.
*H04L 12/28* (2006.01)
*H04L 12/717* (2013.01)
(Continued)

(52) U.S. Cl.
CPC ........... *H04L 45/42* (2013.01); *H04L 41/5006* (2013.01); *H04L 47/748* (2013.01); *H04L 47/783* (2013.01); *H04L 49/25* (2013.01); *H04L 67/327* (2013.01)

(58) Field of Classification Search
CPC . H04L 12/5695; H04L 47/70; H04L 47/291; H04L 12/28; H04L 29/060027; H04L 45/42
See application file for complete search history.

(56) References Cited

U.S. PATENT DOCUMENTS

2002/0174228 A1    11/2002  Kanemaki et al.
2003/0147401 A1*   8/2003  Kyronaho ............... H04L 12/14
                                                370/395.41
(Continued)

FOREIGN PATENT DOCUMENTS

JP    2002-344499 A    11/2002

OTHER PUBLICATIONS

David Chieng et al: "SLA brokering and bandwidth reservation negotiation schemes for QoS-aware internet", IEEE Transactions on Network and Service Management, IEEE, US, vol. 1, No. 1, Nov. 30, 2005, pp. 39-49, XP011253104. ISSN: 1932-4537.

(Continued)

*Primary Examiner* — Andrew Lee

(57) ABSTRACT

A route request mediation apparatus comprises a resource management unit that manages a resource of a network to be managed; a request receiving unit that receives a route request with an added service level condition from a user or another route request mediation apparatus; a negotiation status management unit that forwards the route request to a destination specified by the route request, and manages a negotiation status based on a response from the destination; an acceptance assessment unit that assesses whether or not to accept the route request by referring to the negotiation status managed by the negotiation status management unit and to the resource management unit; and a response sending unit that responds with an assessment result that indicates whether or not the route request is accepted to the request source of the route request.

15 Claims, 20 Drawing Sheets

(51) Int. Cl.
*H04L 12/947* (2013.01)
*H04L 29/08* (2006.01)
*H04L 12/911* (2013.01)
*H04L 12/24* (2006.01)

(56) References Cited

U.S. PATENT DOCUMENTS

| | | | | |
|---|---|---|---|---|
| 2004/0139088 A1* | 7/2004 | Mandato | H04L 12/5695 | 707/999.1 |
| 2006/0171315 A1* | 8/2006 | Choi | H04L 12/5695 | 370/230 |
| 2006/0209898 A1* | 9/2006 | Abdelilah | H04L 12/5695 | 370/477 |
| 2007/0110046 A1* | 5/2007 | Farrell | H04L 69/04 | 370/389 |
| 2007/0147243 A1* | 6/2007 | He | H04L 12/5695 | 370/230 |
| 2008/0310428 A1* | 12/2008 | Lei | H04L 29/06027 | 370/400 |
| 2009/0073893 A1 | 3/2009 | Vu Duong et al. | | |
| 2011/0282928 A1* | 11/2011 | Ball | G06Q 30/06 | 709/202 |
| 2013/0070595 A1* | 3/2013 | Yen | H04L 47/2491 | 370/235 |
| 2014/0244847 A1* | 8/2014 | Pouyllau | H04L 47/70 | 709/226 |

OTHER PUBLICATIONS

Thi Mai Trang Nguyen T et al: "COPS-SLS: A Service Level Negotiation Protocol for the Internet", IEEE Communications Magazine, IEEE Service Center, Piscataway, US, vol. 40, No. 5, May 31, 2002, pp. 158-165. XP011092842. ISSN: 0163-6804.

The extended European search report for EP Application No. 13758417.3 dated on Oct. 13, 2015.

Nick KcKeown et al., "OpenFlow: Enabling Innovation in Campus Networks", [Internet] <URL: http://www.openflow.org/documents/openflow-wp-latest.pdf>, Mar. 14, 2008.

"OpenFlow Switch Specification", Version 1.1.0 Implemented (Wire Protocol 0x02), [Internet] <URL: http://www.openflow.org/documents/openflow-spec-v1.1.0.pdf>, Feb. 28, 2011.

Jong-Cheol Seo et al., "WBEM-based SLA Management across multi-domain networks for QoS-guaranteed DiffServ-over-MPLS Provisioing", The 9th Asia-Pacific Network Operations and Management Symposium, APNOMS 2006, [Internet] <URL: http://www.apnoms.org/2006/publication/hmj/Technical_Session/TS-07.2pdf>, Sep. 27-29, 2006.

Toufik Ahmed et al., "End-to-end quality of service provisioning through an integrated management system for multimedia content delivery", Computer Communications, ScienceDirect, [Internet] <URL: http://citeseerx.ist.psu.edu/viewdoc/download?doi=10.1.1.140.4432&rep=rep1&type=pdf>, Nov. 20, 2006, vol. 30, Issue3, pp. 638-651.

International Search Report for PCT Application No. PCT/JP2013/056236, mailed on May 7, 2013.

* cited by examiner

FIG. 5

| NEGOTIATION TRANSACTION ID | REQUEST SOURCE ID | NEGOTIATION STATUS | SERVICE LEVEL CONDITION | RESOURCE ALLOCATION DESTINATION | ... |
|---|---|---|---|---|---|
| 0001 | U1 | RESOURCE ALLOCATION PENDING | NETWORK BANDWIDTH 10Mbps | OWN NW | ... |
| 0002 | 10A | IN USE | NETWORK BANDWIDTH 5 | OWN NW | ... |
| ... | ... | ... | ... | ... | ... |
| 00XX | U2 | RESOURCE UNALLOCATED | NA | NA | ... |
| 00YY | 10C | RESOURCE RELEASE PENDING | NETWORK BANDWIDTH 100Mbps | OWN NW, 10A | ... |
| 00ZZ | U4 | CANCELLED | NETWORK BANDWIDTH 100Mbps | OWN NW, DC_B | ... |

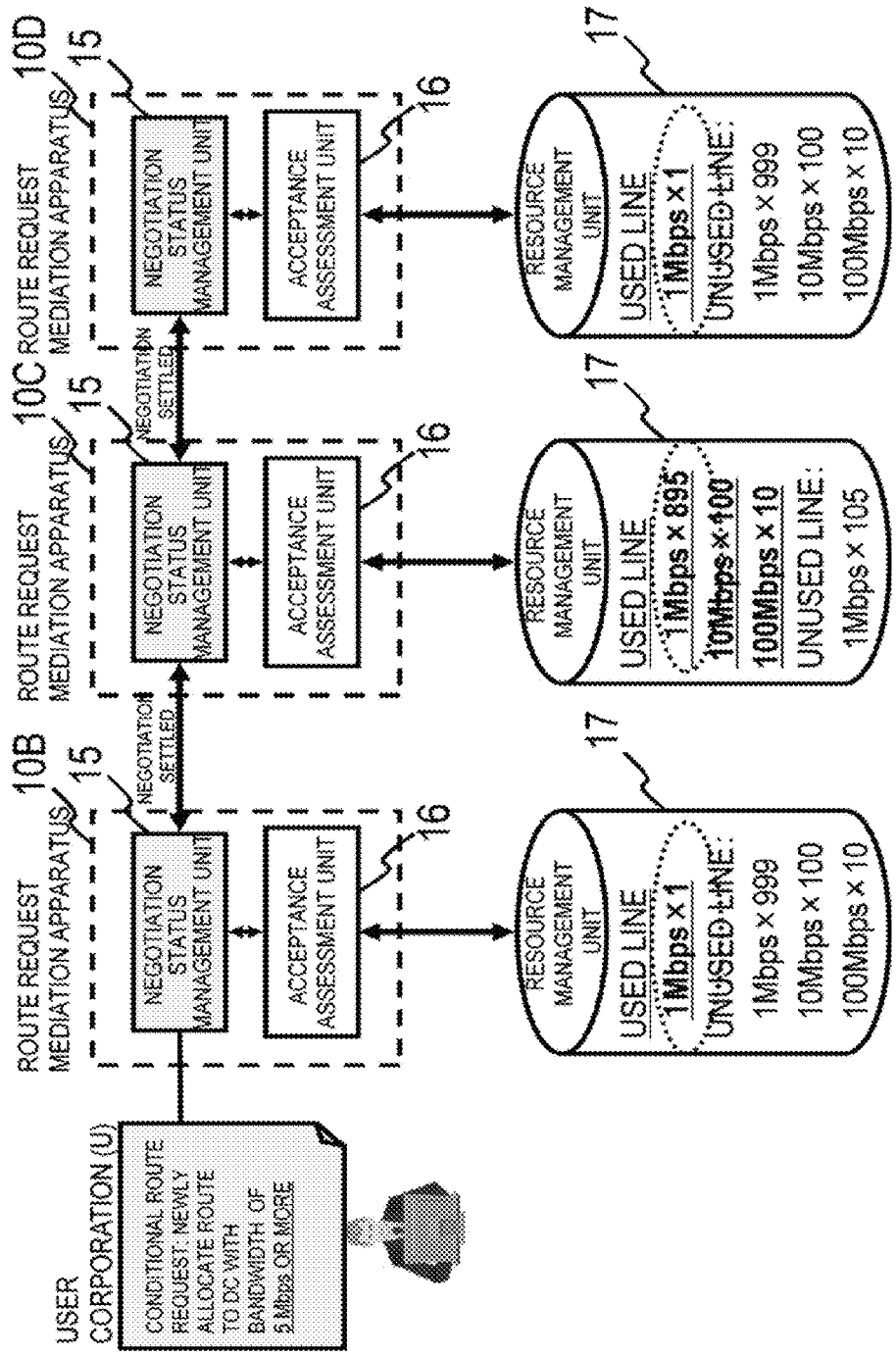

ROUTE REQUEST MEDIATION APPARATUS, CONTROL APPARATUS, ROUTE REQUEST MEDIATION METHOD AND PROGRAM

REFERENCE TO RELATED APPLICATION

The present application is a National Stage Entry of PCT/JP2013/056236 filed Mar. 7, 2013, which is based upon and claims the benefit of the priority of Japanese patent application No. 2012-051117 filed on Mar. 8, 2012, the disclosures of all of which are incorporated herein in their entirety by reference.

TECHNICAL FIELD

The present invention relates to a route request mediation apparatus, control apparatus, route request mediation method and program, and particularly to a route request mediation apparatus, control apparatus, route request mediation method and program that operate in concert with a plurality of route request mediation apparatuses.

BACKGROUND

In recent years, a technology called OpenFlow has been proposed (refer to Non-Patent Literatures 1 and 2). OpenFlow treats communication as an end-to-end flow, and a central control apparatus called OpenFlow controller performs route control, failure recovery, load balancing, and optimization for each flow by controlling an OpenFlow switch.

Patent Literature 1 discloses a configuration that enables a user to view content with a bandwidth guarantee when he views it from a content server across a plurality of ISPs. According to the literature, out of two communication apparatuses (DTE-a and the content server α) that perform data forwarding across a plurality of ISPs (ISP-a and ISP-b) on the Internet, one of the communication apparatuses applies to a bandwidth allocation intermediate server (broker server β) that brokers the allocation of transmission bandwidth on the Internet to allocate bandwidth for a data transmission path on which data is transmitted, and the bandwidth allocation intermediate server allocates the transmission bandwidth for the data transmission path on behalf of the two communication apparatuses.

[Patent Literature 1]
Japanese Patent Kokai Publication No. JP-P2002-344499A

[Non-Patent Literature 1]
Nick McKeown, et. al. "OpenFlow: Enabling Innovation in Campus Networks," [online], [searched on Feb. 8, 2012], the Internet <URL: http://www.openflow.org/documents/openflow-wp-latest.pdf>

[Non-Patent Literature 2]
"OpenFlow Switch Specification" Version 1.1.0 Implemented (Wire Protocol 0x02), [online], [searched on Feb. 8, 2012], the Internet <URL: http://www.openflow.org/documents/openflow-spec-v1.1.0.pdf>

SUMMARY

The following analysis is given by the present invention. It is predicted that end-to-end communications will be performed across a plurality of networks when central control networks such as the ones described in Non-Patent Literatures 1 and 2 are constructed by telecommunications carriers and corporations, and are connected to each other. When it happens, the issue will be how central control apparatuses controlling routes and bandwidth operate with each other to allocate resources required for the communications.

In this regard, the configuration of Patent Literature 1 has a problem that the bandwidth allocation intermediate server (broker server β) grasping the address, etc., of the policy server of each ISP must be provided. Further, in the configuration of Patent Literature 1, the bandwidth allocation intermediate server (broker server β) transmits a policy (the order number, the IP address of the user, the IP address of the content provider, the allocated bandwidth, the reservation start date and time, etc.) to a policy server between the two communication apparatuses, but when no policy server is able to secure the required line bandwidth, the reservation is not possible and line bandwidths already secured by other policy servers must be instructed to be released. This may cause a situation in which line bandwidths are reserved more than necessary, and if the release command is delayed, the utilization efficiency of the line will decrease.

It is an object of the present invention to provide a route request mediation apparatus, control apparatus, route request mediation method, and program capable of effectively allocating individual network resources even without using an intermediate server, such as the one described in Patent Literature 1, in a configuration in which central control networks, such as the ones described in Non-Patent Literatures 1 and 2, are mutually connected.

According to a first aspect, there is provided a route request mediation apparatus comprising a resource management unit that manages a resource of a network to be managed, a request receiving unit that receives a route request with an added service level condition from a user or another route request mediation apparatus, a negotiation status management unit that forwards the route request to a destination specified by the route request, and manages a negotiation status based on a response from the destination; an acceptance assessment unit that assesses whether or not to accept the route request by referring to the negotiation status managed by the negotiation status management unit and to the resource management unit, and a response sending unit that responds with an assessment result indicating whether or not the route request is accepted to the request source of the route request.

According to a second aspect, there is provided a control apparatus realizing a route request accepted by the route request mediation apparatus above by controlling a switch in a network.

According to a third aspect, there is provided a route request mediation method performed by a route request mediation apparatus comprising a resource management unit that manages a resource of a network to be managed; and the route request mediation method includes receiving a route request with an added service level condition from a user or another route request mediation apparatus, forwarding the route request to a destination specified by the route request and managing a negotiation status based on a response from the destination, assessing whether or not to accept the route request by referring to the negotiation status managed by the negotiation status management unit and to the resource management unit, and responding with an assessment result indicating whether or not the route request is accepted to the request source of the route request. The present method is tied to a particular machine, which is the route request mediation apparatus that receives a route request from a user or another route request mediation apparatus and allocates a resource by working together with other route request mediation apparatuses.

According to a fourth aspect, there is provided a program having a computer that constitutes a route request mediation apparatus comprising a resource management unit that manages a resource of a network to be managed execute a process of receiving a route request with an added service level condition from a user or another route request mediation apparatus, a process of forwarding the route request to a destination specified by the route request and managing a negotiation status based on a response from the destination, a process of assessing whether or not to accept the route request by referring to the negotiation status managed by the negotiation status management unit and to the resource management unit, and a process of responding with an assessment result indicating whether or not the route request is accepted to the request source of the route request. Further, this program can be stored in a computer-readable storage medium. In other words, the present invention can be realized as a computer program product.

The meritorious effects of the present invention are summarized as follows.

According to the present disclosure, individual network resources can be suitably allocated without using an intermediate server in a configuration in which central control networks are mutually connected.

BRIEF DESCRIPTION OF DRAWINGS

FIG. 5 is a drawing showing an example of a table held by a negotiation status management unit of the route request mediation apparatus of the first exemplary embodiment of the present disclosure.

FIG. 20 is a drawing showing the operation of the route request mediation apparatus of the first exemplary embodiment of the present disclosure.

PREFERRED MODES

Figure 1:
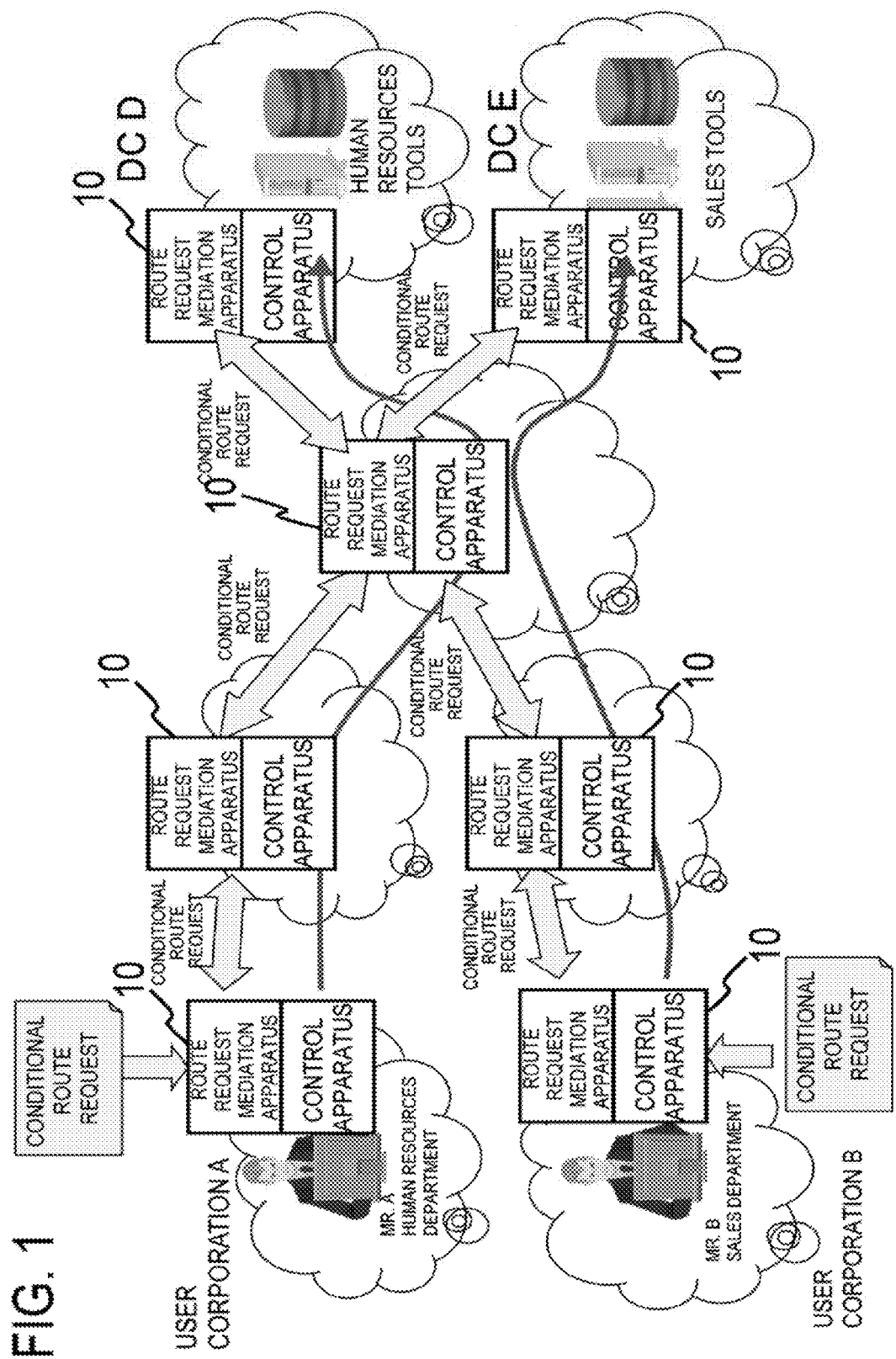
FIG. 1 is a drawing showing the configuration of an exemplary embodiment of the present disclosure.

First, a summary of an exemplary embodiment of the present disclosure will be given with reference to the drawings. Note that drawing reference signs in the summary are given to each element for convenience as examples solely for facilitating understanding and the present disclosure is not limited to the exemplary embodiments shown in the drawings.

As shown in FIG. 1, the present disclosure, in an exemplary embodiment thereof, can be realized with a configuration in which at least one route request mediation apparatus 10 is provided in each network. Each route request mediation apparatus 10 comprises a resource management unit that manages a resource of a network to be managed; a request receiving unit that receives a route request with an added service level condition from a user or another route request mediation apparatus; a negotiation status management unit that forwards the route request to a destination specified by the route request, and manages a negotiation status based on a response from the destination; an acceptance assessment unit that assesses whether or not to accept the route request by referring to the negotiation status managed by the negotiation status management unit and to the resource management unit; and a response sending unit that responds with an assessment result indicating whether or not the route request is accepted to the request source of the route request.

Figure 2:
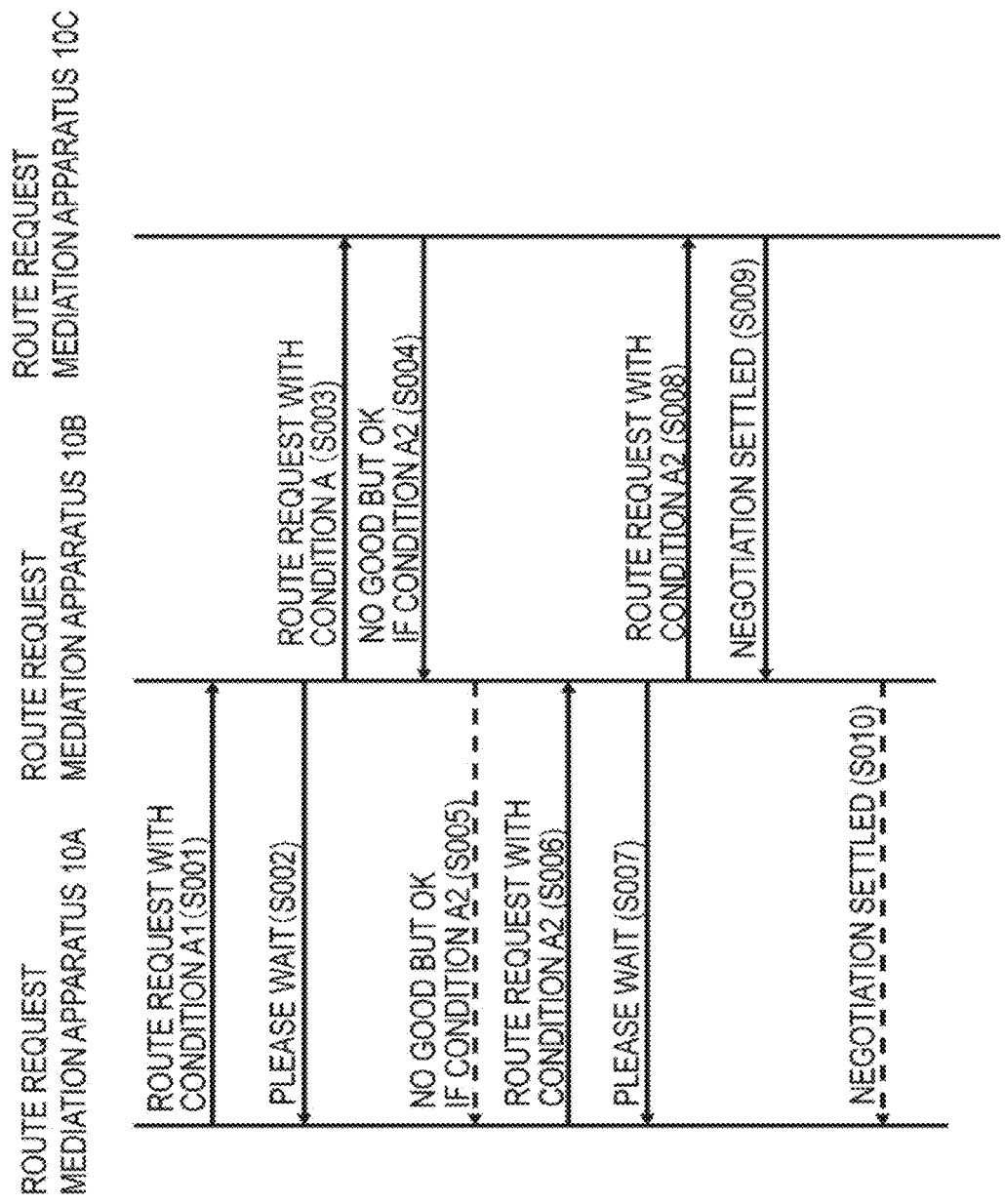
FIG. 2 is a sequence diagram showing the basic operation of an exemplary embodiment of the present disclosure.

FIG. 2 is a sequence diagram showing the operation between the route request mediation apparatuses 10A, 10B, and 10C of the present exemplary embodiment. As shown in FIG. 2, when receiving a route request with an added service level condition (condition A1) from a user or another route request mediation apparatus, the first route request mediation apparatus 10A forwards the route request to a destination (here, the destination is a network in which the route request mediation apparatus 10C is provided) specified by the route request (S001).

Having received the route request, the second route request mediation apparatus 10B transmits only the fact that the route request has been received, not a response to the route request, to the first route request mediation apparatus 10A (S002). Next, the second route request mediation apparatus 10B forwards the route request to the destination (the third route request mediation apparatus 10C) specified by the route request (S003).

Having received the route request, the third route request mediation apparatus 10C checks whether or not a resource requested by the route request can be provided based on the usage and availability of resources managed by the resource management unit, and responds to the second route request mediation apparatus 10B (S004). This response includes the amount of the resource (condition A2) that the third route request mediation apparatus 10C is able to provide to the route request source even when the entire amount of the resource requested by the route request cannot be provided (NG).

The second route request mediation apparatus 10B forwards this response to the first route request mediation apparatus 10A (S005).

As a result, the route request source is able to determine whether or not to resend the route request with a condition (condition A1) with a lowered service level after grasping the amount of a resource that the third route request mediation apparatus 10C can provide. In the example of FIG. 2, since the route request is resent to the first route request mediation apparatus 10A with a service level condition degraded to the level of the condition (A2) in the response from the third route request mediation apparatus 10C, the negotiation is settled and the resource is allocated to each of the route request mediation apparatuses 10A to 10C under the degraded condition (A2) (S006 to S010).

Figure 3:
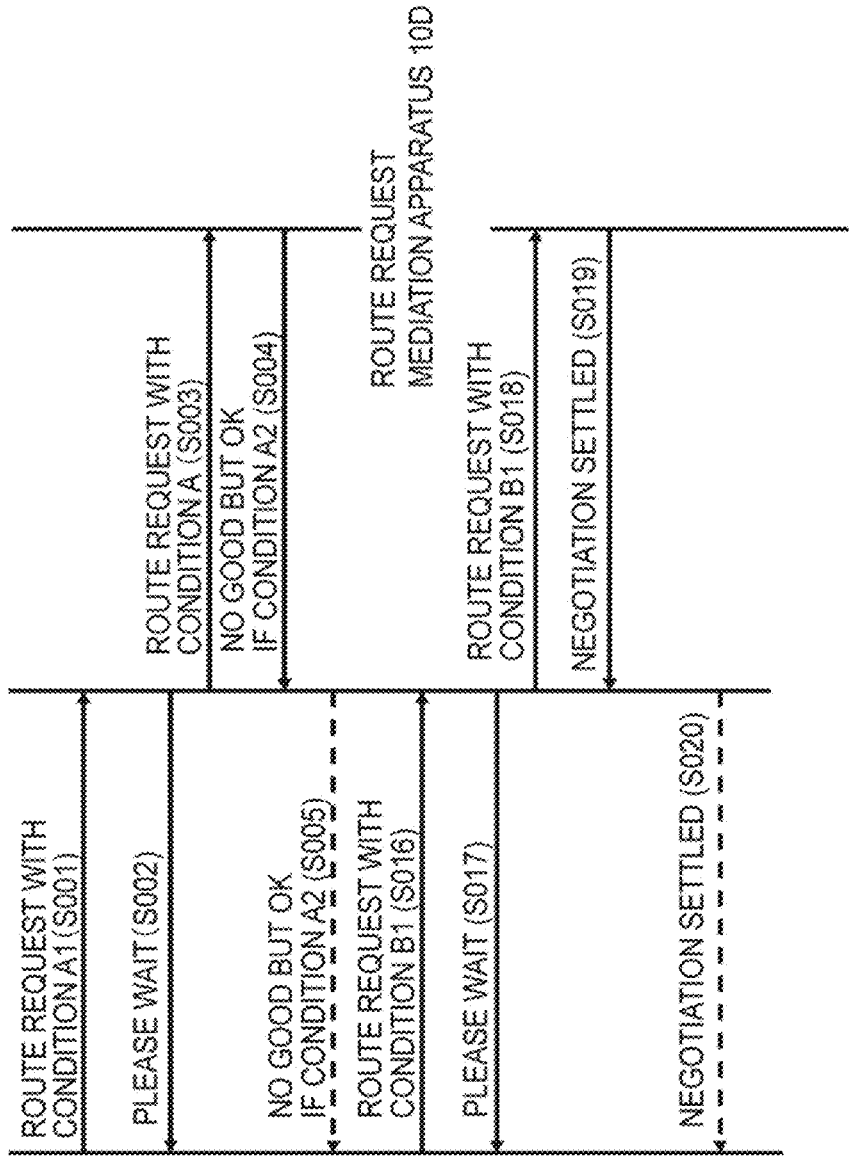
FIG. 3 is another sequence diagram showing the basic operation of an exemplary embodiment of the present disclosure.

Meanwhile, when the amount of the resource indicated in the response from the third route request mediation apparatus 10C is deemed to be insufficient, a route request with a condition B1 may be sent to a fourth route request mediation apparatus 10D capable of providing the same service as the third route request mediation apparatus 10C and provided in anther network, as shown in S016 to S020 in FIG. 3.

As described, according to the present exemplary embodiment, realized is an interactive mediation protocol in which the route request mediation apparatus provided in each network autonomously forwards a route request, receives feedback indicating the amount of an available resource from the route request mediation apparatus in the destination network, and resends a route request. As a result, the route request source is able to flexibly determine whether to receive a desired service under a slightly relaxed (degraded) condition or to receive a service matching its condition from another network even with an extra cost.

Further, a control apparatus equivalent to the OpenFlow controller controlling the OpenFlow switch described in Non-Patent Literatures 1 and 2 can be used as a mechanism that performs route control and bandwidth control according to an established route request as described above.

Exemplary Embodiment 1

Figure 4:
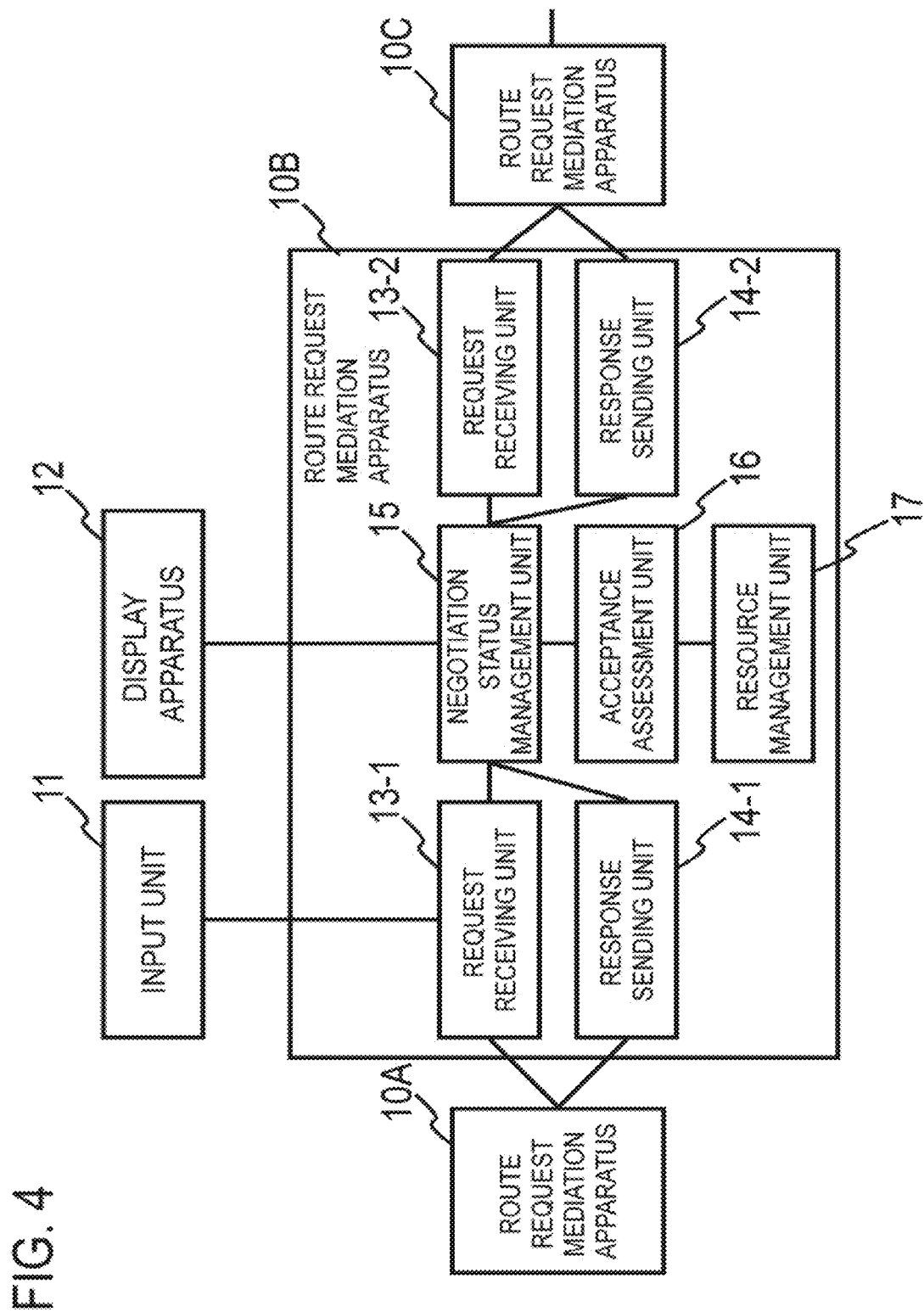
FIG. 4 is a drawing showing the configuration of a route request mediation apparatus of a first exemplary embodiment of the present disclosure.

Next, a first exemplary embodiment of the present disclosure, in which the negotiation status management unit inside the route request mediation apparatus performs detailed status management, will be described in detail with reference to the drawings. FIG. 4 is a drawing showing the configuration of the route request mediation apparatus of the first exemplary embodiment of the present disclosure.

FIG. 4 shows the configuration of the route request mediation apparatus 10B connected to the route request mediation apparatuses 10A and 10C. The route request mediation apparatus 10B comprises the request receiving units 13-1 and 13-2, the response sending units 14-1 and 14-2, the negotiation status management unit 15, the acceptance assessment unit 16, and the resource management unit 17. Further, in the example in FIG. 4, an input unit 11 is connected to the request receiving unit 13-1 of the route request mediation apparatus 10B, and a display apparatus 12 is connected to the negotiation status management unit 15. The input unit 11 and the display apparatus 12 may be omitted if unnecessary. Further, the route request mediation apparatuses 10A and 10C are configured identically, although not shown in FIG. 4.

The input unit 11 is used when a user enters a route request, and the display apparatus 12 is used for displaying a route request received from other apparatuses and a response thereto.

From the input unit 11 or the route request mediation apparatus 10A, the request receiving unit 13-1 receives a route request with a service level condition added (simply referred to as "route request" hereinafter) or a response to the route request, and outputs it to the negotiation status management unit 15.

The request receiving unit 13-2 also receives a route request with a service level condition added or a response to the route request from the route request mediation apparatus 10C, and outputs it to the negotiation status management unit 15.

From the negotiation status management unit 15, the response sending unit 14-1 receives a response to the route request from the route request mediation apparatus 10A, and transmits it to the route request mediation apparatus 10A.

As the response sending unit 14-1, the response sending unit 14-2 also receives from the negotiation status management unit 15 a response to the route request from the route request mediation apparatus 10C, and transmits it to the route request mediation apparatus 10C.

Further, in the example of FIG. 4, the request receiving units 13-1 and 13-2, and the response sending units 14-1 and 14-2 are provided on the sides of the route request mediation apparatuses 10A and 10C, respectively, but the request receiving units 13-1 and 13-2, and the response sending units 14-1 and 14-2 may be separately integrated.

The resource management unit 17 manages a resource to be managed in a network in which the route request mediation apparatus 10B is provided. In the present exemplary embodiment, it is assumed that the resource management unit 17 manages network line bandwidth.

The acceptance assessment unit 16 responds to a request from the negotiation status management unit 15 and assesses whether or not to accept the resource amount requested by a route request. Further, responding to an instruction from the negotiation status management unit 15, the acceptance assessment unit 16 instructs the resource management unit 17 to allocate or release a resource.

For instance, the negotiation status management unit 15 manages the negotiation status of each route request using a negotiation status management table shown in FIG. 5. Further, the negotiation status management unit 15 requests the acceptance assessment unit 16 to determine whether or not to accept the resource amount requested by a route request when the route request requests a resource in its own network. Further, when the negotiation status of a route request changes, the negotiation status management unit 15 instructs a resource to be allocated or released via the acceptance assessment unit 16 according to the content of the change.

FIG. 5 shows an example of the negotiation status management table held in the negotiation status management unit 15. With reference to FIG. 5, a table capable of storing a record that associates a negotiation transaction ID, request source ID, negotiation status, service level condition, and requested resource location with each other is shown. Further, "NA" in FIG. 5 indicates a state in which no designation is made.

The "negotiation transaction ID" is an ID for uniquely understanding the transfer of a series of messages derived from a new route request by regarding the transfer as a transaction every time a route request is received, and is issued by the negotiation status management unit 15.

The "request source ID" is an ID identifying the sources of the route request such as the user and the route request mediation apparatus.

The "negotiation status" is a field in which status information such as "resource unallocated," "resource allocation pending," "resource release pending," "in use," and "cancelled" is recorded as shown in FIG. 5. The "resource unallocated" status indicates a state in which a new route request has been received and a negotiation transaction ID has been issued. "Resource allocation pending" indicates a state in which there is a response from the route request mediation apparatus in the destination of the route request and a resource indicated by the response (resource corresponding to the resource amount in the response) has been reserved. "Resource release pending" indicates a state in which a route request requesting the reduction of a requested resource has been received from the request source of the route request and a resource in use includes an unnecessary amount. "In use" indicates a state in which a route request negotiation has been settled and a resource has been allocated as requested by the route request. "Cancelled" indicates a state in which a route cancellation request has been received from the request source of the route request.

"Service level condition" and "requested resource location" indicate the service level included in a route request such as a requested bandwidth and the location of the requested resource.

Figure 6:
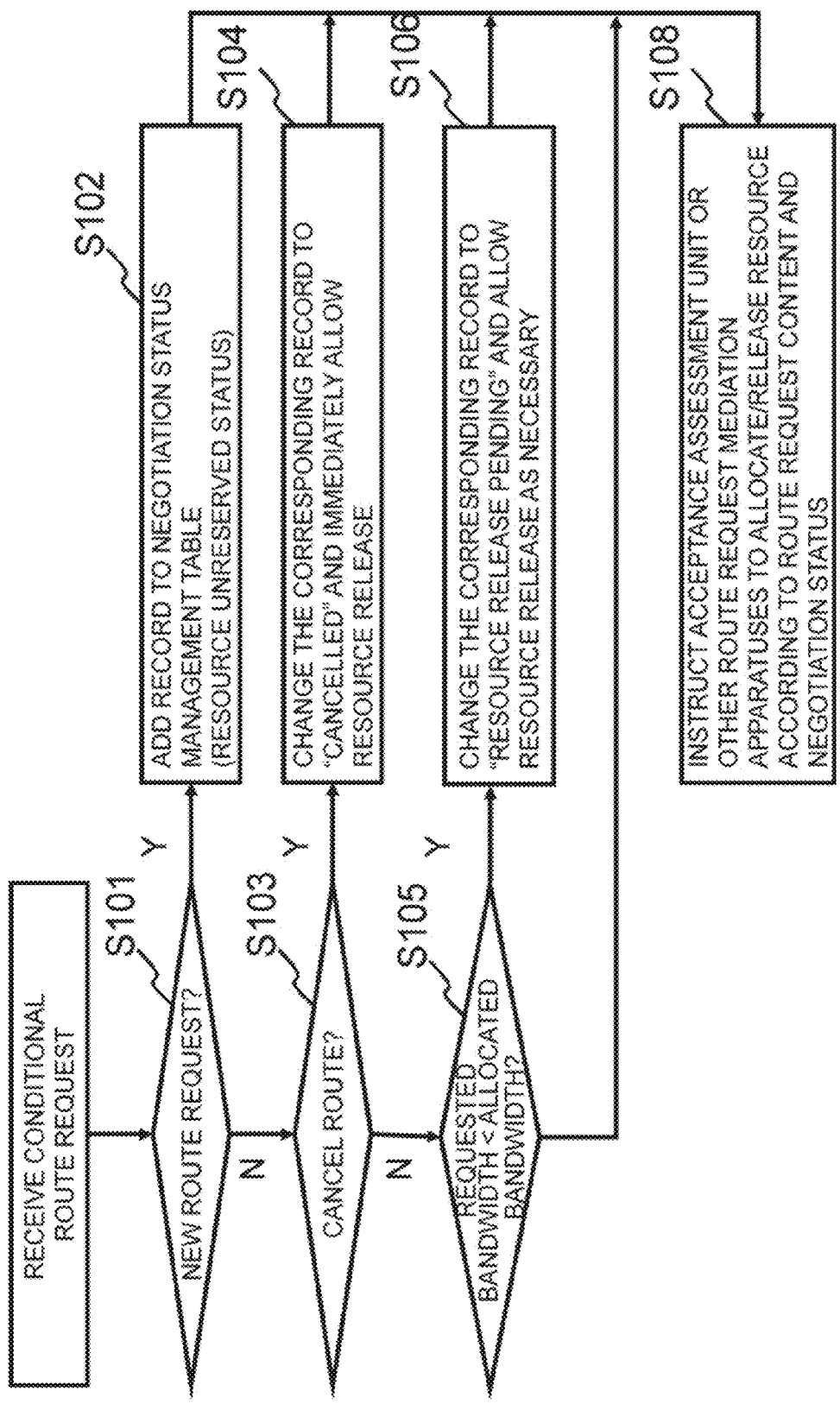
FIG. 6 is a drawing showing a flow of updating the negotiation status table by the negotiation status management unit of the route request mediation apparatus of the first exemplary embodiment of the present disclosure.
Figure 7:
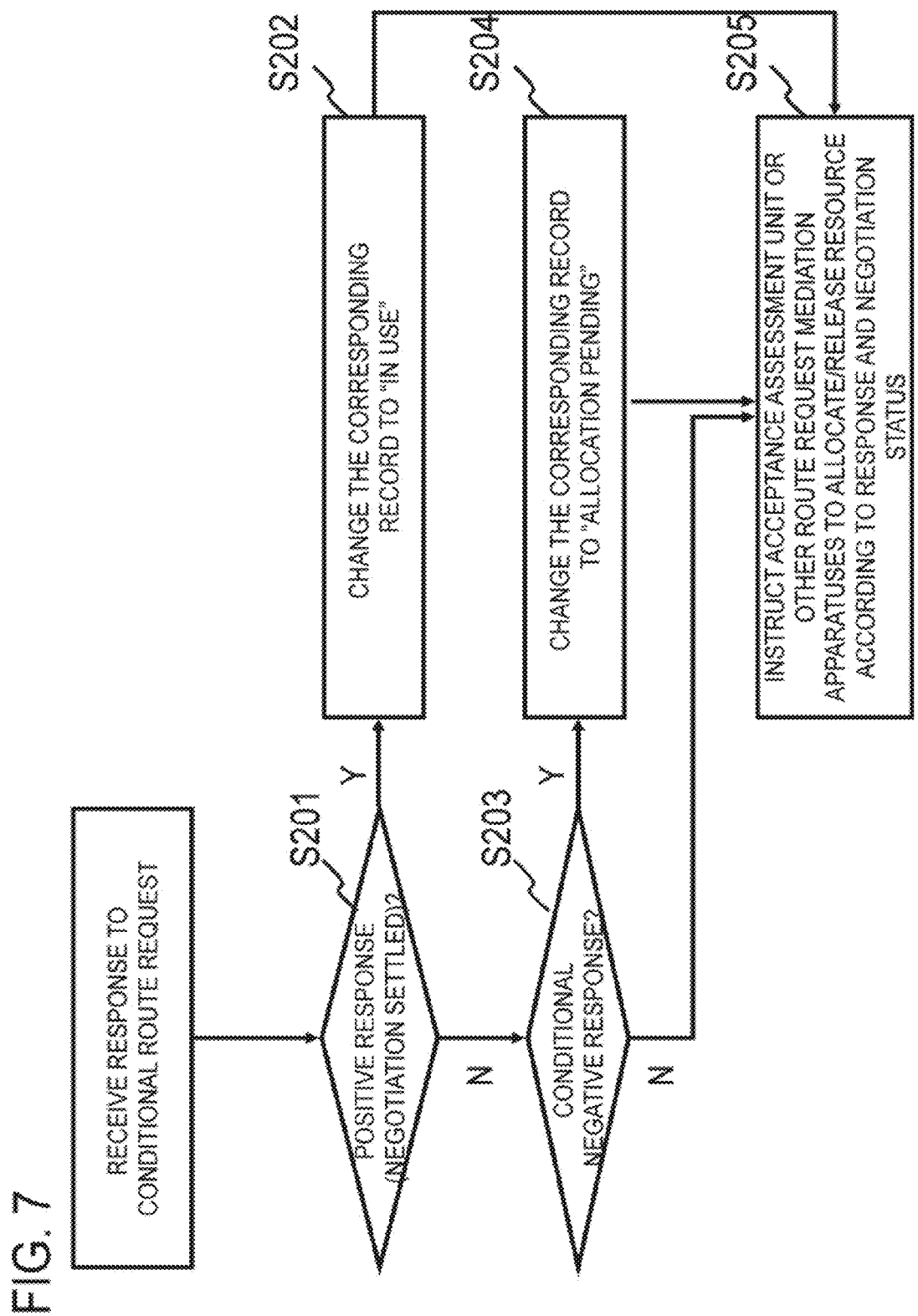
FIG. 7 is another drawing showing a flow of updating the negotiation status table by the negotiation status management unit of the route request mediation apparatus of the first exemplary embodiment of the present disclosure.

FIGS. 6 and 7 are flowcharts showing the operation of the negotiation status management unit 15 when receiving a route request or response from the input unit 11 or another route request mediation apparatus. With reference to FIGS. 6 and 7, the basic operation of the negotiation status management unit 15 will be described below. With reference to FIG. 6, first when receiving a new route request (Y in step S101), the negotiation status management unit 15 adds a new record to the negotiation status management table (step S102). The negotiation status of the record at this point is "resource unallocated" as the record of a negotiation transaction ID 00XX shown in FIG. 5. When the received route request only requests a resource in its own network, the acceptance assessment unit 16 is inquired whether or not the requested resource can be accepted, and if so, the resource is allocated (step S108). Meanwhile, when the received route request requests a resource outside its own network, the route request is forwarded to the route request mediation apparatus to which the resource is allocated, and a response therefrom is awaited (the step S108).

Further, when the received route request is not a new route request (N in the step S101) but a route request requesting the cancellation of a route (Y in step S103), the negotiation status management unit 15 changes the negotiation status of the corresponding record to the "cancelled" status (step S104) as the record of a negotiation transaction ID 00ZZ shown in FIG. 5. When the received route cancellation applies to a resource of its own network, the resource management unit 18 is permitted to release the resource via the acceptance assessment unit 16 (the step S108). Further, when the received route cancellation applies to a resource outside its own network, the route request requesting the cancellation of the route is forwarded to the route request mediation apparatus to which the resource is allocated (the step S108).

Further, when the received route request is neither a new route request nor a route request requesting the cancellation of a route (N in the step S103), the negotiation status management unit 15 checks whether or not the bandwidth requested by the received route request is less than the bandwidth reserved for or used by the same transaction ID (step S105). If the bandwidth requested by the received route request is less than the bandwidth reserved for or used by the same transaction ID (Y in the step S105), this means that a route request requesting the reduction of a requested resource is received from the request source of the route request; therefore, the negotiation status management unit 15 changes the negotiation status of the corresponding record to the "resource release pending" status as the record of a negotiation transaction ID 00YY in FIG. 5 (step S106). Further, when the received route request applies to a resource in its own network, the resource management unit 17 is sent an instruction of resource release pending via the acceptance assessment unit 16 (step S107). Upon receiving the resource release pending instruction, the resource management unit 17 is able to release an unnecessary resource as necessary. Further, when the received route request also applies to a resource outside its own network, the route request decreasing the requested bandwidth is forwarded to the route request mediation apparatus to which the resource is allocated (the step S108).

Meanwhile, when the bandwidth requested by the received route request is equal to or more than the bandwidth reserved for or used by the same transaction ID (N in the step S105), the negotiation status management unit 15 forwards the route request to the acceptance assessment unit 16 and the route request mediation apparatus to which the resource in question is allocated without changing the negotiation status of the corresponding record (the step S108).

Upon receiving a response from the route request mediation apparatus to which the route request was forwarded in the step S108 in FIG. 6, the negotiation status management unit 15 checks if the content thereof is a positive response (the negotiation settled) as shown in FIG. 7 (step S201). When a positive response is received (Y in the step S201), the negotiation status management unit 15 changes the negotiation status of the corresponding record to the "in use" status (step S202). Further, the acceptance assessment unit 16 is requested to allocate a resource, and the received response is forwarded to the route request mediation apparatus and the user of the request source of the route request (step S205).

Meanwhile, when the response is a negative response (N in the step S201), the negotiation status management unit 15 checks if this negative response has any condition (step S203). Here, when the negative response has a condition (Y in the step S203), since the negotiation continues, the negotiation status management unit 15 changes the negotiation status of the corresponding record to the "resource allocation pending" status (step S204). Further, the acceptance assessment unit 16 is requested to allocate (reserve) a resource, and the received response is forwarded to the route request mediation apparatus and the user of the request source of the route request (the step S205).

Meanwhile, when the negative response has no condition (N in the step S203), the negotiation status management unit 15 forwards the received response to the acceptance assessment unit 16 and the route request mediation apparatus and the user of the request source of the route request without changing the negotiation status of the corresponding record (the step S205).

Further, the route request mediation apparatus described above can be realized by a computer program that has a computer constituting the route request mediation apparatus execute each processing described using the hardware thereof.

Next, the flow of the route request mediation processing by the route request mediation apparatus of the present exemplary embodiment will be described on a step-by-step basis with reference to FIGS. 8 to 20. In the example described below, a user corporation (U) accessing the route request mediation apparatus 10B shown in FIG. 4 requests a route to a data center (DC), in which a route request mediation apparatus 10D of a different network is provided, via the route request mediation apparatus 10C of a adjacent network.

Figure 8:
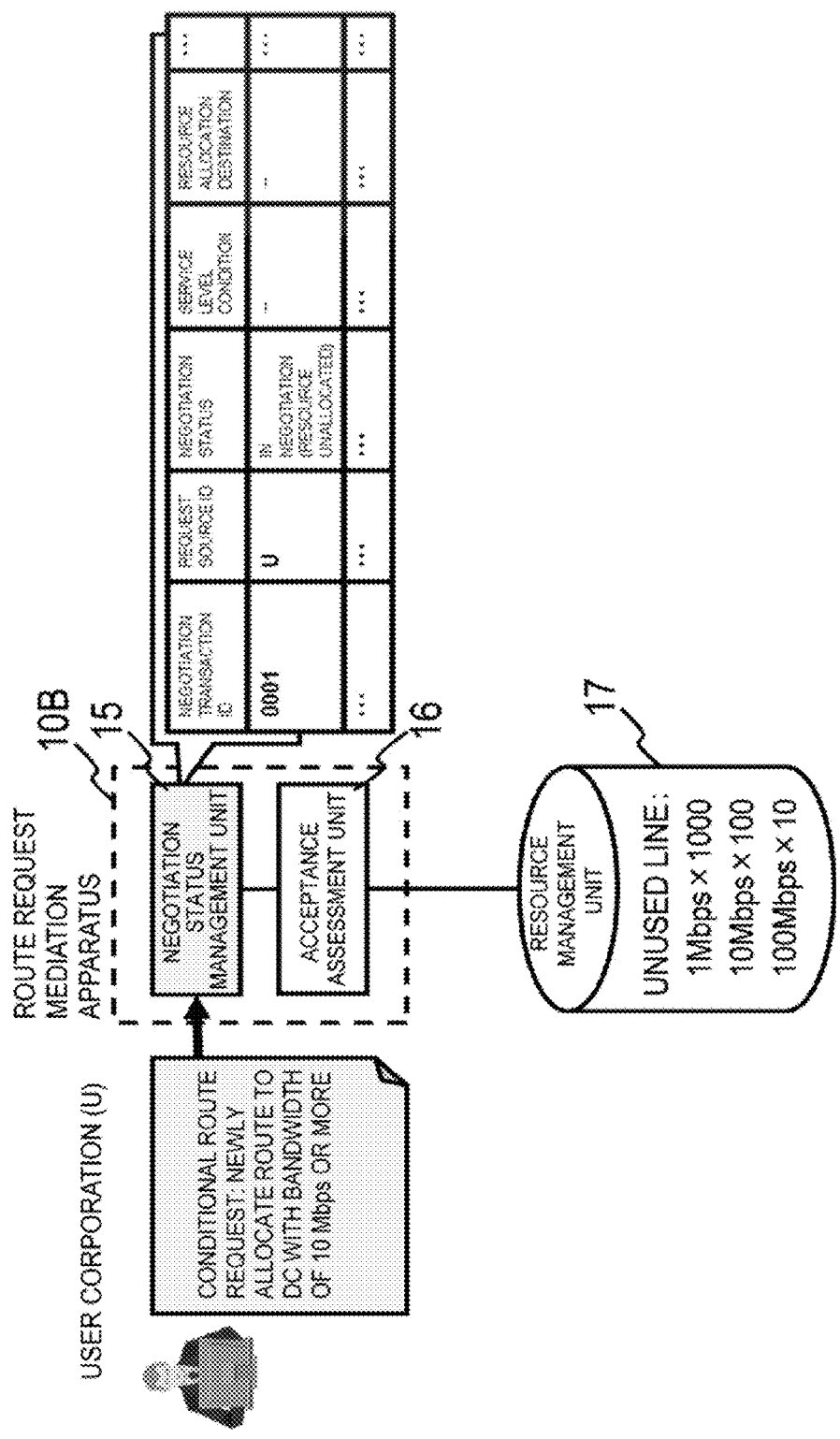
FIG. 8 is a drawing showing the operation of the route request mediation apparatus of the first exemplary embodiment of the present disclosure.

FIG. 8 is a drawing showing a state (1) in which the user corporation U transmits a new route request requesting the nearest route request mediation apparatus 10B to allocate a bandwidth of 10 Mbps or more. Having received the route request, the negotiation status management unit 15 of the route request mediation apparatus 10B generates a record with the user corporation U as the request source ID and 0001 as the transaction ID. At this point, the negotiation status is "resource unallocated;" therefore, the line of the resource management unit 17 is still unused.

Figure 9:
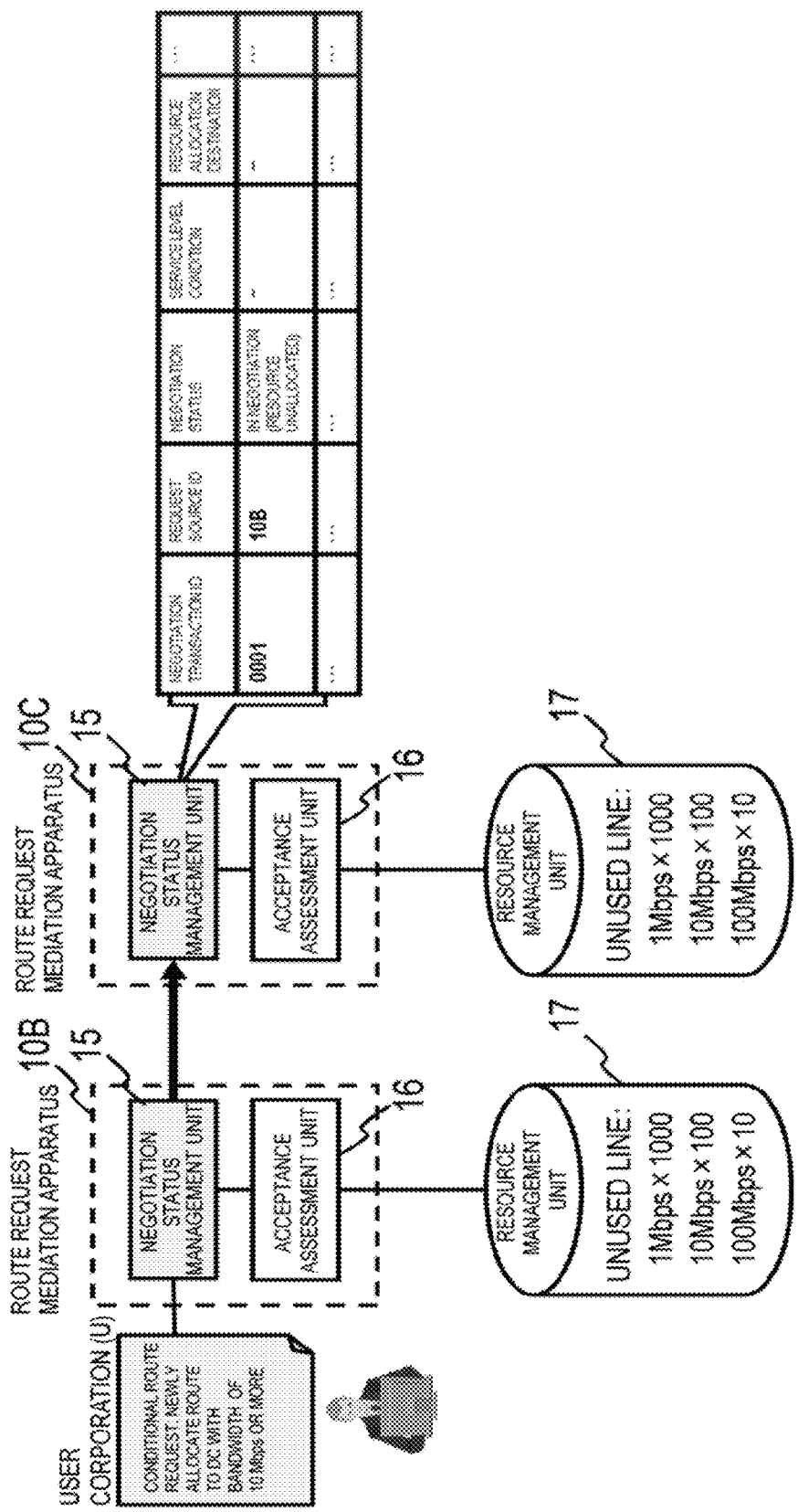
FIG. 9 is a drawing showing the operation of the route request mediation apparatus of the first exemplary embodiment of the present disclosure.

FIG. 9 is a drawing showing a state (2) in which the route request mediation apparatus 10B forwards the conditional route request to the adjacent route request mediation apparatus 10C. As shown in FIG. 9, since the resource allocation destination of the route request is not in its own network, the route request mediation apparatus 10B forwards the route request to the adjacent route request mediation apparatus 10C. Upon receiving the route request, the negotiation status management unit 15 of the route request mediation apparatus 10C generates a record with the route request mediation apparatus 10B as the request source ID and 0001 as the transaction ID, as the route request mediation apparatus 10B. At this point, the negotiation status is "resource unallocated;" therefore, the line of the resource management unit 17 of the route request mediation apparatus 10C is still unused.

Figure 10:
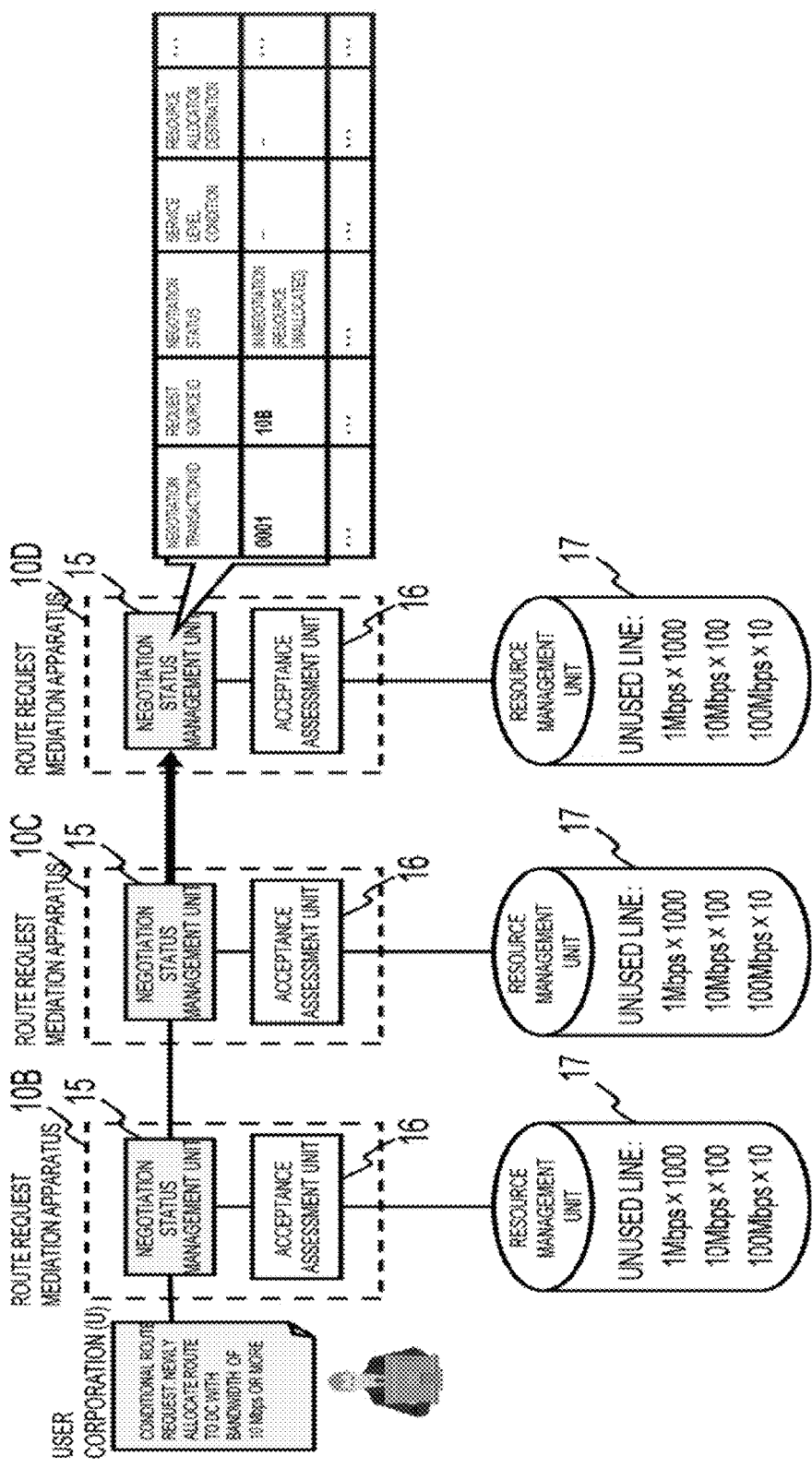
FIG. 10 is a drawing showing the operation of the route request mediation apparatus of the first exemplary embodiment of the present disclosure.

FIG. 10 is a drawing showing a state (3) in which the route request mediation apparatus 10C forwards the route request to the destination (DC). As shown in FIG. 10, since the resource allocation destination of the route request is not in its own network, the route request mediation apparatus 10C forwards the route request to the adjacent route request mediation apparatus 10D. Upon receiving the route request, the negotiation status management unit 15 of the route request mediation apparatus 10D generates a record with the route request mediation apparatus 10C as the request source ID and 0001 as the transaction ID, as the route request mediation apparatuses 10B and 10C. At this point, the negotiation status is "resource unallocated;" therefore, the line of the resource management unit 17 of the route request mediation apparatus 10C is still unused.

Figure 11:
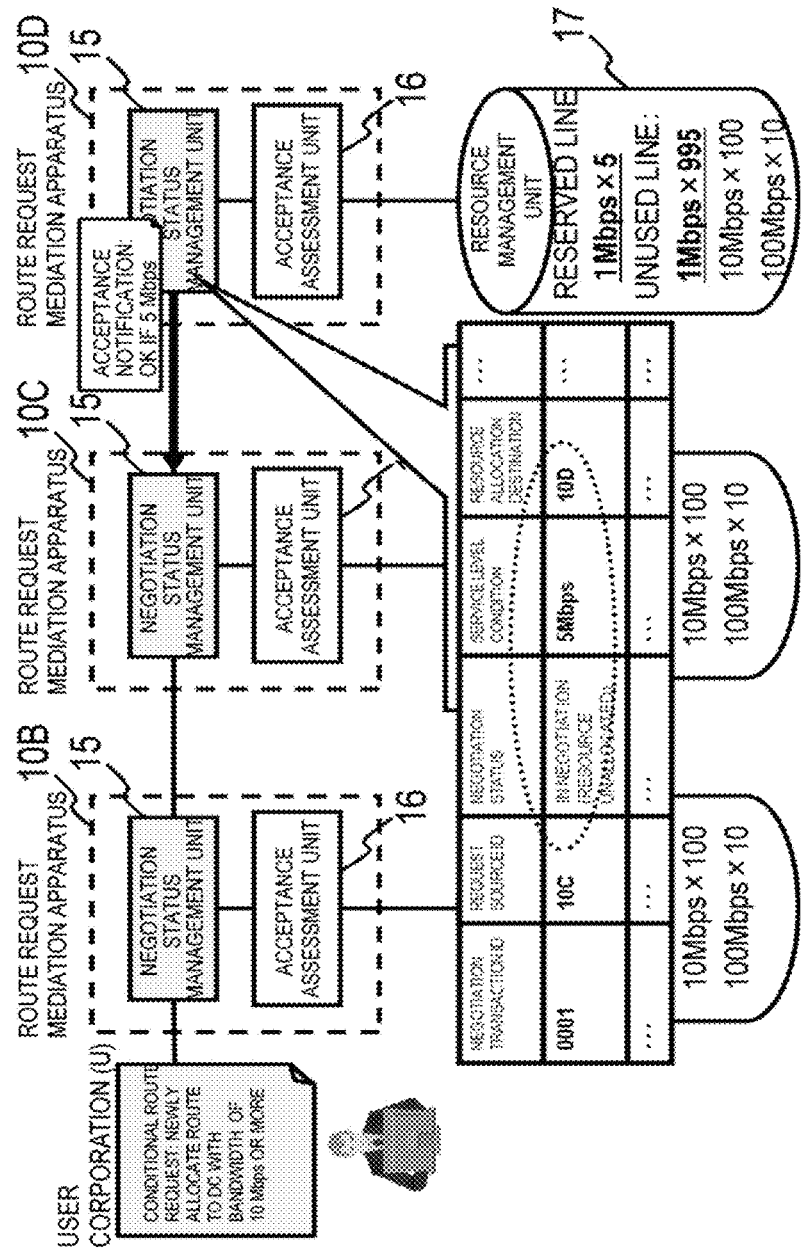
FIG. 11 is a drawing showing the operation of the route request mediation apparatus of the first exemplary embodiment of the present disclosure.

FIG. 11 is a drawing showing a state (4) in which the route request mediation apparatus 10D of the destination (DC) is performing acceptance assessment. As shown in FIG. 11, since the resource allocation destination of the route request is in its own network, the negotiation status management unit 15 of the route request mediation apparatus 10D asks the acceptance assessment unit 16 if the request can be accepted. Here, it is assumed that, according to a predetermined resource allocation policy, the acceptance assessment unit 16 of the route request mediation apparatus 10D replies that 5 Mbps, the upper limit of the policy, may be allocated. Upon receiving this response, the negotiation status management unit 15 of the route request mediation apparatus 10D changes the negotiation status of the record having the transaction ID 0001 to "resource allocation pending," and updates the service level condition and the resource allocation destination. Further, the negotiation status management unit 15 of the route request mediation apparatus 10D requests the acceptance assessment unit 16 to reserve 5 Mbps. As a result, 5 Mbps on the line of the resource management unit 17 of the route request mediation apparatus 10D are reserved. Further, the negotiation status management unit 15 of the route request mediation apparatus 10D transmits a negative response with a condition of 5 Mbps (OK if 5 Mbps) to the route request mediation apparatus 10C, the request source.

Figure 12:
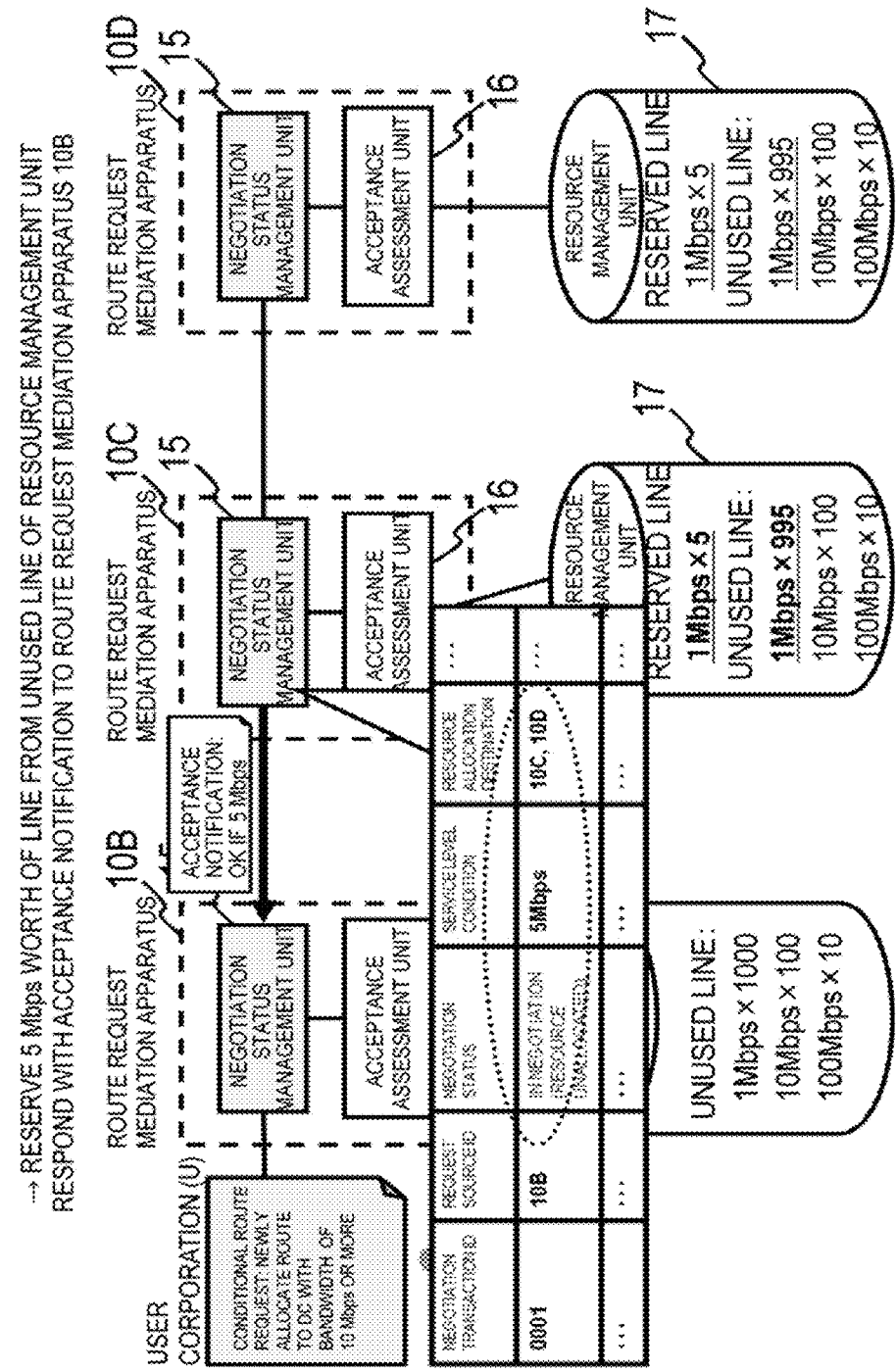
FIG. 12 is a drawing showing the operation of the route request mediation apparatus of the first exemplary embodiment of the present disclosure.

FIG. 12 is a drawing showing a state (5) in which the negotiation status management unit of the route request mediation apparatus 10C is performing acceptance assessment based on the conditional negative response. As shown in FIG. 12, the negotiation status management unit 15 of the route request mediation apparatus 10C asks the acceptance assessment unit 16 if the conditional negative response can be accepted. Here, it is assumed that the acceptance assessment unit 16 of the route request mediation apparatus 10C replies that 5 Mbps can be allocated as requested. Upon receiving this response, the negotiation status management unit 15 of the route request mediation apparatus 10C changes the negotiation status of the record having the transaction ID 0001 to "resource allocation pending," and updates the service level condition and the resource allocation destination. Further, the negotiation status management unit 15 of the route request mediation apparatus 10C requests the acceptance assessment unit 16 to reserve 5 Mbps. As a result, 5 Mbps on the line of the resource management unit 17 of the route request mediation apparatus 10C are reserved. Further, the negotiation status management unit 15 of the route request mediation apparatus 10C transmits a negative response with a condition of 5 Mbps (OK if 5 Mbps) to the route request mediation apparatus 10B, the request source.

Figure 13:
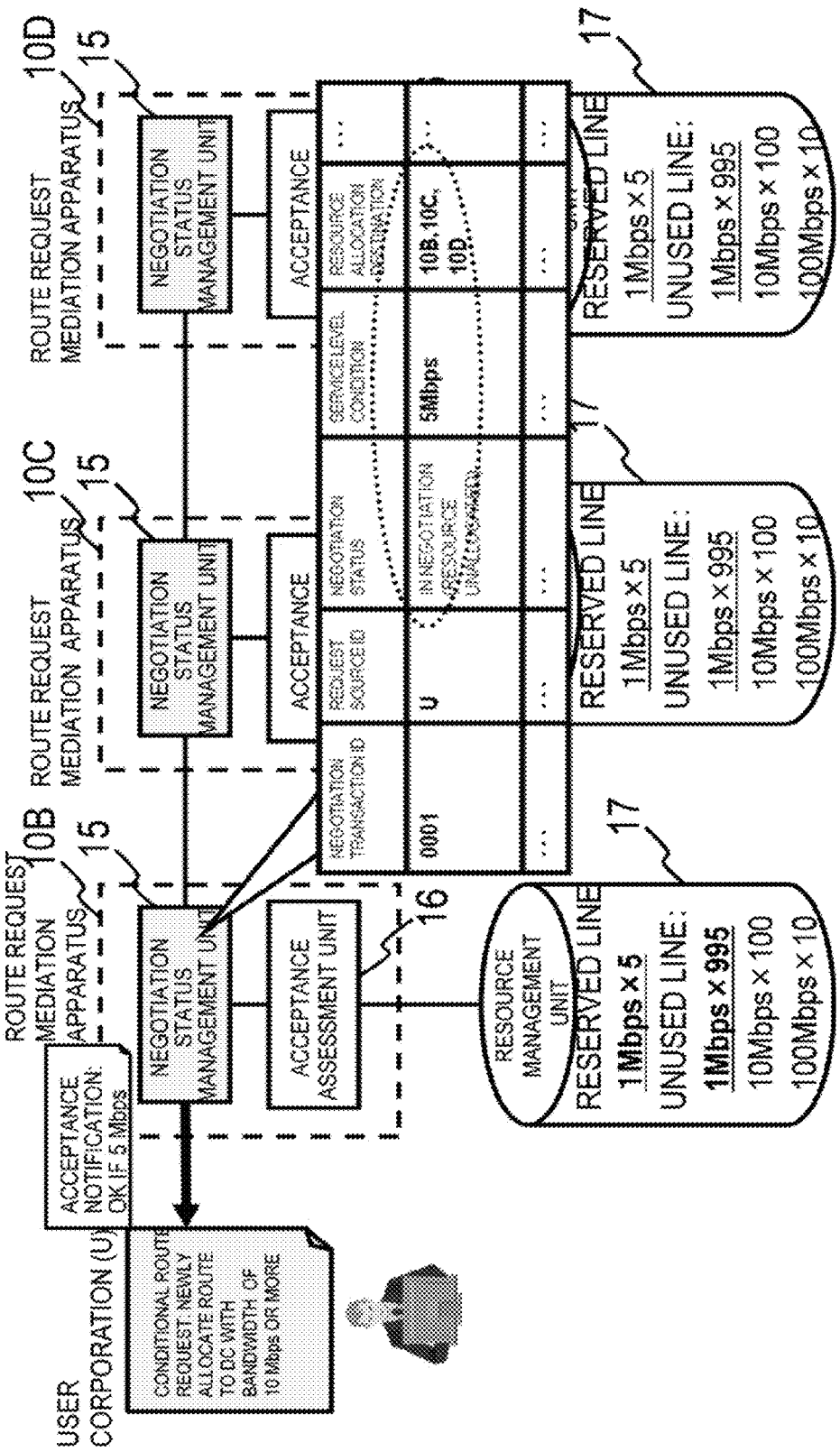
FIG. 13 is a drawing showing the operation of the route request mediation apparatus of the first exemplary embodiment of the present disclosure.

FIG. 13 is a drawing showing a state (6) in which the negotiation status management unit of the route request mediation apparatus 10B is performing acceptance assessment based on the conditional negative response. As shown in FIG. 13, the negotiation status management unit 15 of the route request mediation apparatus 10B asks the acceptance assessment unit 16 if the conditional negative response can be accepted. Here, it is assumed that the acceptance assessment unit 16 of the route request mediation apparatus 10B also replies that 5 Mbps can be allocated as requested. Upon receiving this response, the negotiation status management unit 15 of the route request mediation apparatus 10B changes the negotiation status of the record having the transaction ID 0001 to "resource allocation pending," and updates the service level condition and the resource allocation destination. Further, the negotiation status management unit 15 of the route request mediation apparatus 10B requests the acceptance assessment unit 16 to reserve 5 Mbps. As a result, 5 Mbps on the line of the resource management unit 17 of the route request mediation apparatus 10B are reserved. Further, the negotiation status management unit 15 of the route request mediation apparatus 10B transmits a negative response with a condition of 5 Mbps (OK if 5 Mbps) to the user corporation (U), the request source.

Figure 14:
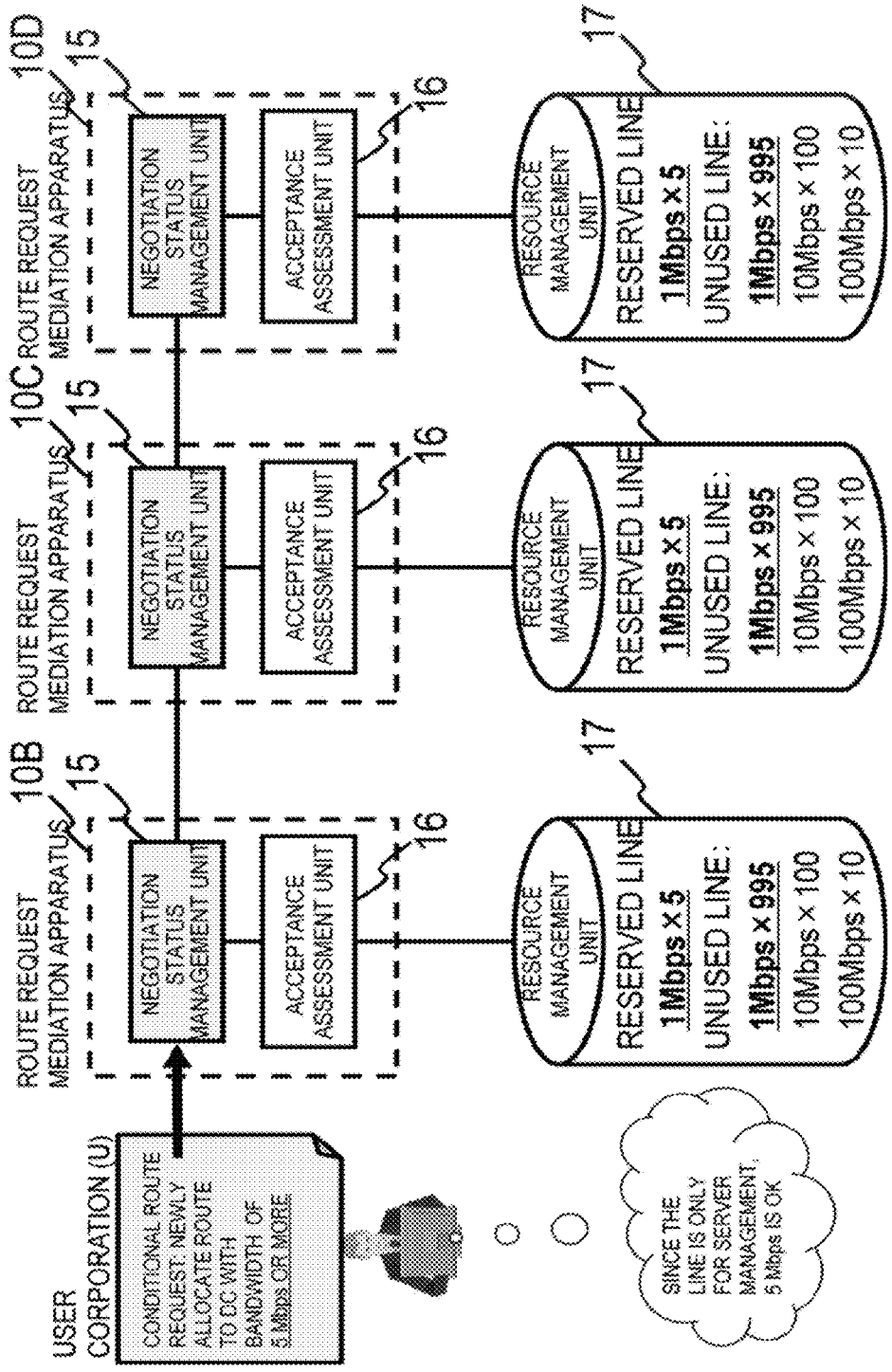
FIG. 14 is a drawing showing the operation of the route request mediation apparatus of the first exemplary embodiment of the present disclosure.

FIG. 14 is a drawing showing a state (7) in which the user corporation U transmits a route request again with the initial request of 10 Mbps degraded to 5 Mbps based on the conditional negative response (OK if 5 Mbps).

Figure 15:
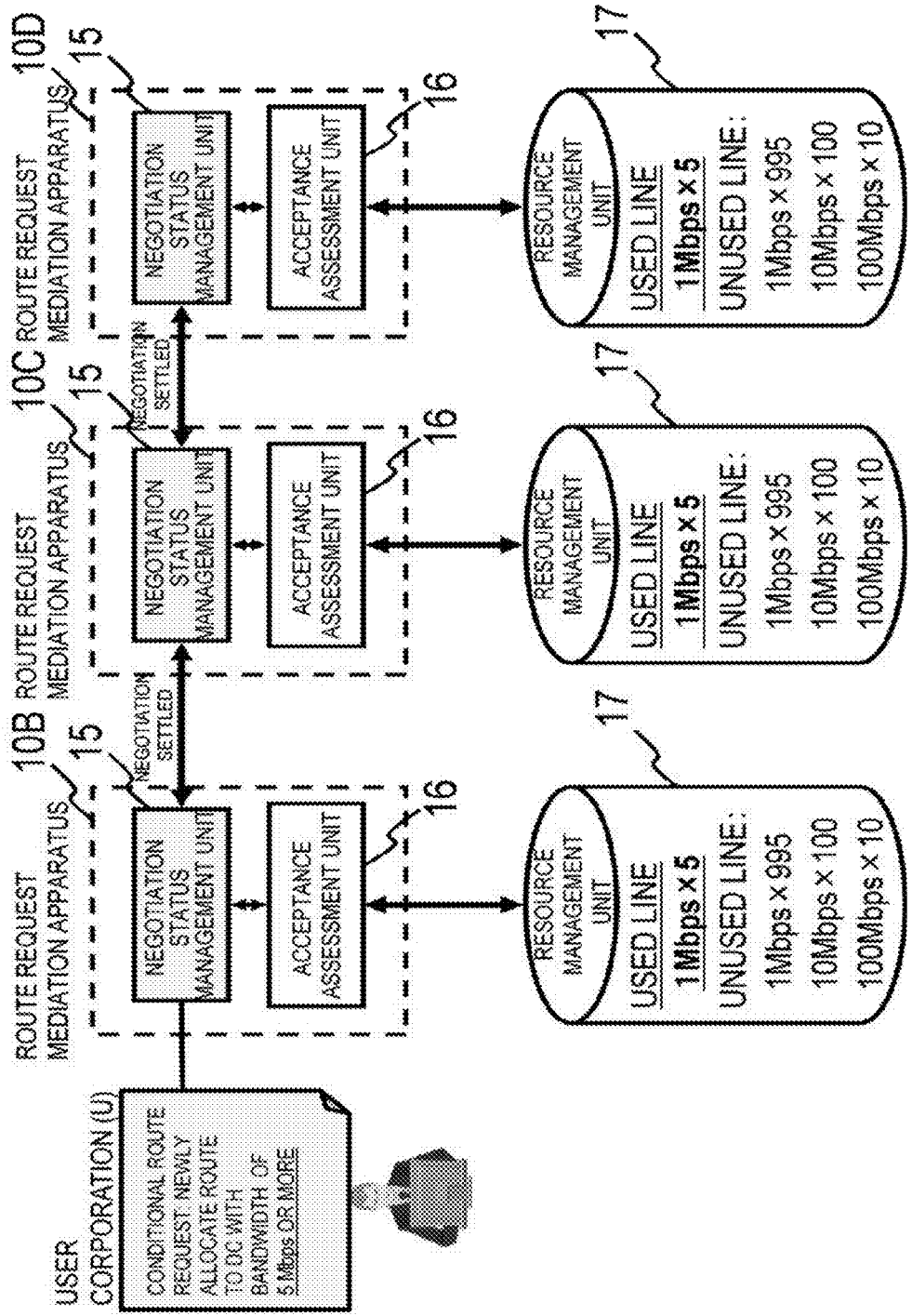
FIG. 15 is a drawing showing the operation of the route request mediation apparatus of the first exemplary embodiment of the present disclosure.

FIG. 15 is a drawing showing a state (8) in which the route request mediation apparatus 10B forwards the route request with the degraded condition of 5 Mbps in order. The route request mediation apparatuses 10B and 10C forward the route request. The negotiation status management unit 15 of the route request mediation apparatus 10D asks the acceptance assessment unit 16 if the request can be accepted since the resource allocation destination of the route request is in its own network. The acceptance assessment unit 16 of the route request mediation apparatus 10D replies that a bandwidth for the route request can be allocated since a bandwidth of 5 Mbps has been already secured. Upon receiving this response, the negotiation status management unit 15 of the route request mediation apparatus 10D changes the negotiation status of the record having the transaction ID 0001 to "in use" and requests the acceptance assessment unit 16 to allocate 5 Mbps. As a result, 5 Mbps on the line of the resource management unit 17 of the route request mediation apparatus 10D become in use. Further, the negotiation status management unit 15 of the route request mediation apparatus 10D transmits a positive response to the requested bandwidth of 5 Mbps to the route request mediation apparatus 10C, the request source. Similarly, the negotiation status management units 15 of the route request mediation apparatuses 10C and 10B change the negotiation status of the record having the transaction ID 0001 to "in use" and requests the acceptance assessment unit 16 to allocate 5 Mbps. As a result, the user corporation U is able to use the line.

Figure 16:
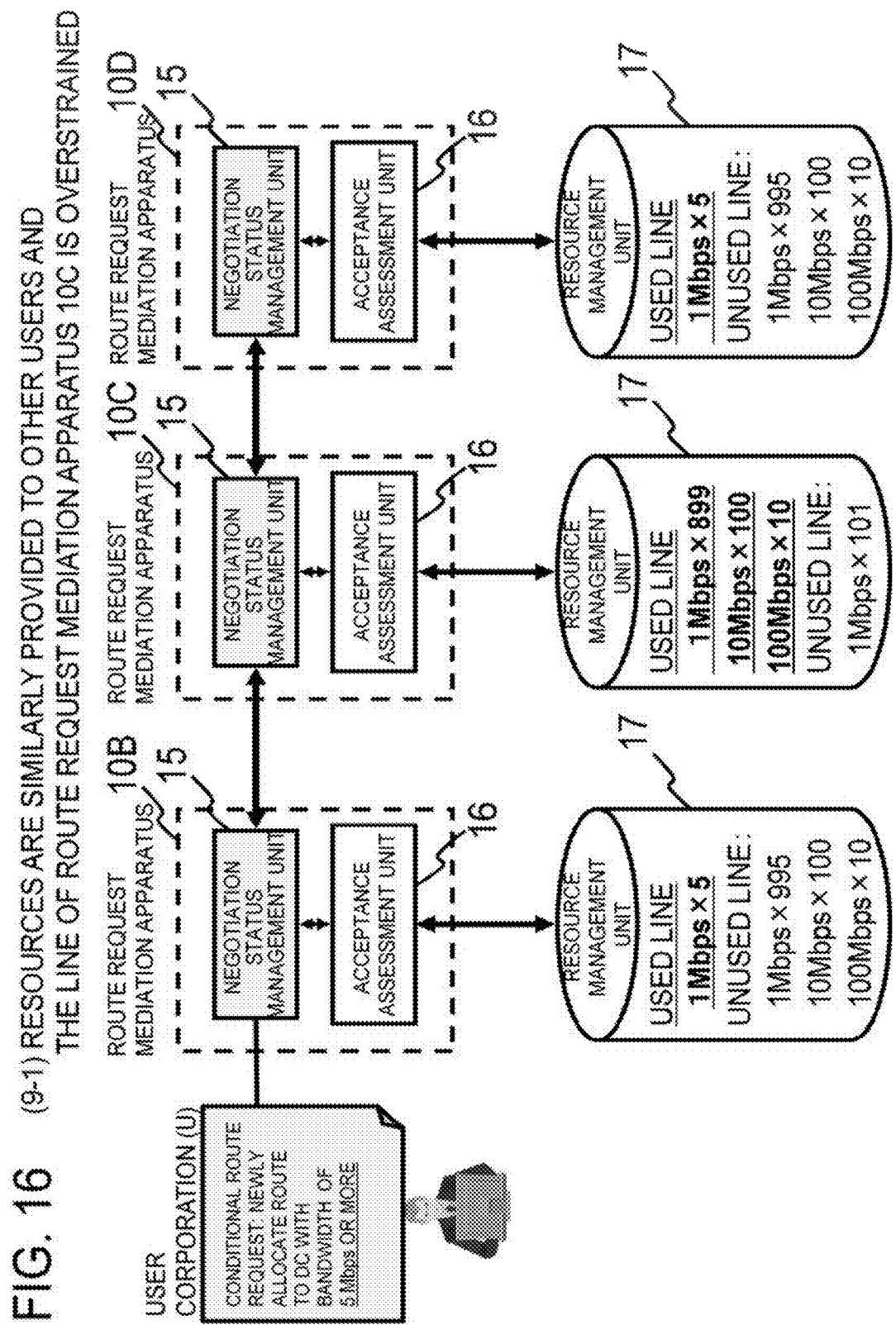
FIG. 16 is a drawing showing the operation of the route request mediation apparatus of the first exemplary embodiment of the present disclosure.

FIG. 16 is a drawing showing a state (9-1) in which the line of the route request mediation apparatus 10C becomes overstrained after some time has elapsed since the state in FIG. 5 as a result of providing resources to other users in the same procedure. The bandwidth of 5 Mbps requested by the user corporation U is still allocated in this state as well.

Figure 17:
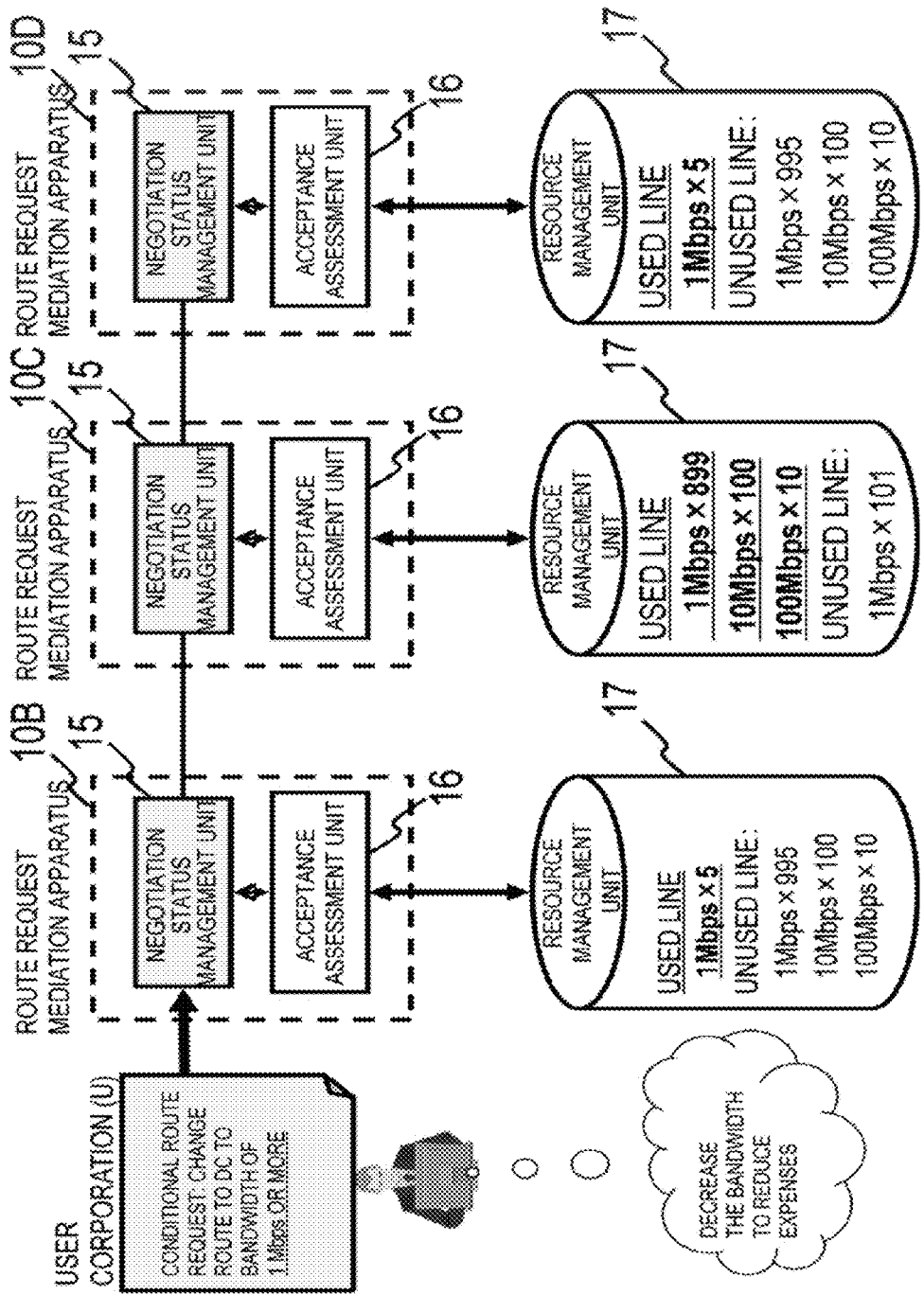
FIG. 17 is a drawing showing the operation of the route request mediation apparatus of the first exemplary embodiment of the present disclosure.

FIG. 17 is a drawing showing a state (9-2) in which the user corporation U using the line requests the degradation of the service level. This request is made by transmitting a route request with the requested bandwidth degraded to 1 Mbps.

Figure 18:
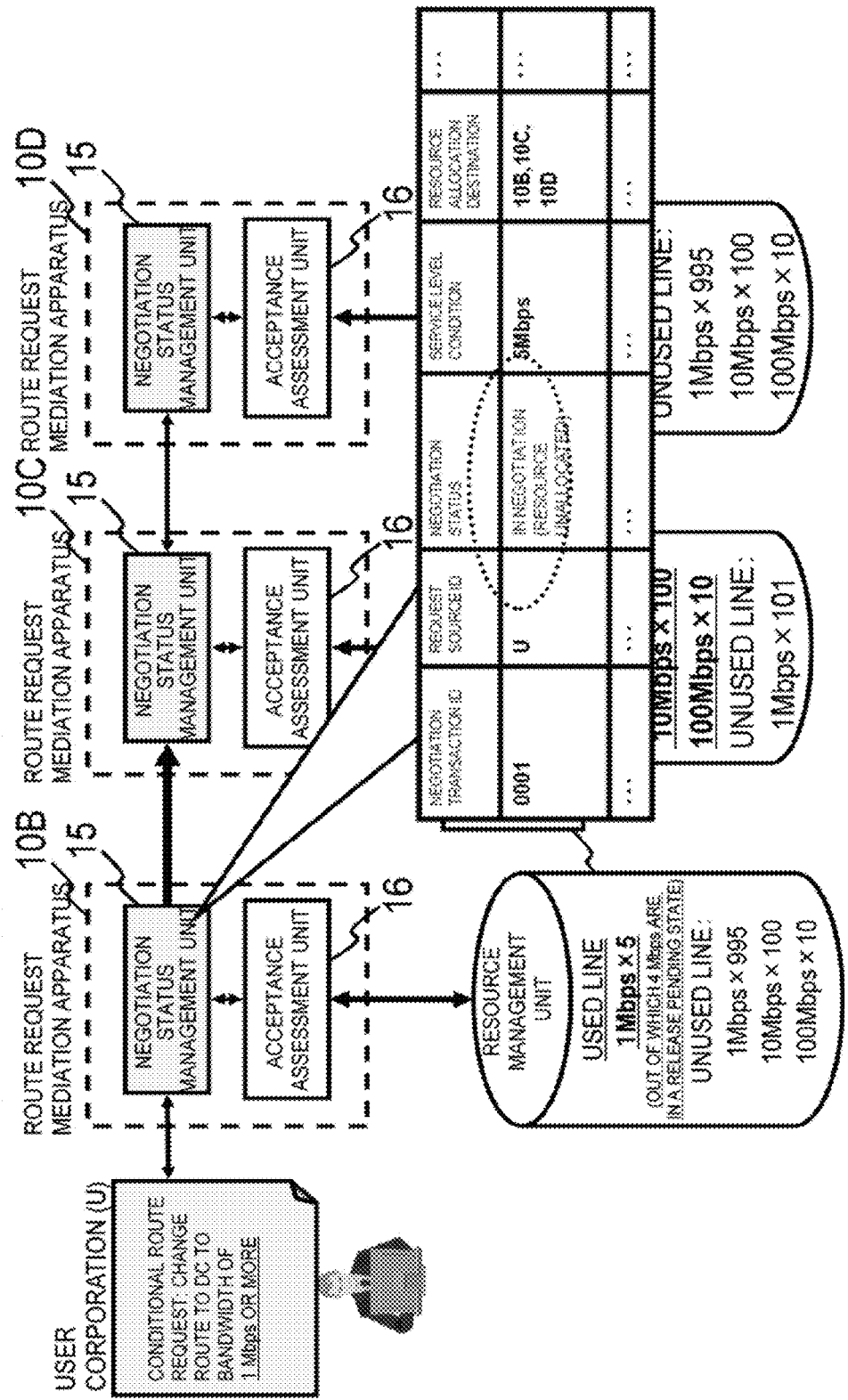
FIG. 18 is a drawing showing the operation of the route request mediation apparatus of the first exemplary embodiment of the present disclosure.

FIG. 18 is a drawing showing a state (9-3) in which the route request mediation apparatus 10B receives the route request with the requested bandwidth degraded to 1 Mbps. Having received the route request with the requested bandwidth degraded to 1 Mbps, the route request mediation apparatus 10B changes the negotiation status of the record having the transaction ID 0001 to "resource release pending" and transmits the route request with the requested bandwidth degraded to 1 Mbps to the route request mediation apparatus 10C. Further, the negotiation status management unit 15 of the route request mediation apparatus 10B notifies the acceptance assessment unit 16 that the difference of 4 Mbps is in a resource release pending state in which the resource can be released anytime. As a result, 4 Mbps on the line of the resource management unit 17 of the route request mediation apparatus 10D gets into a release pending state.

Figure 19:
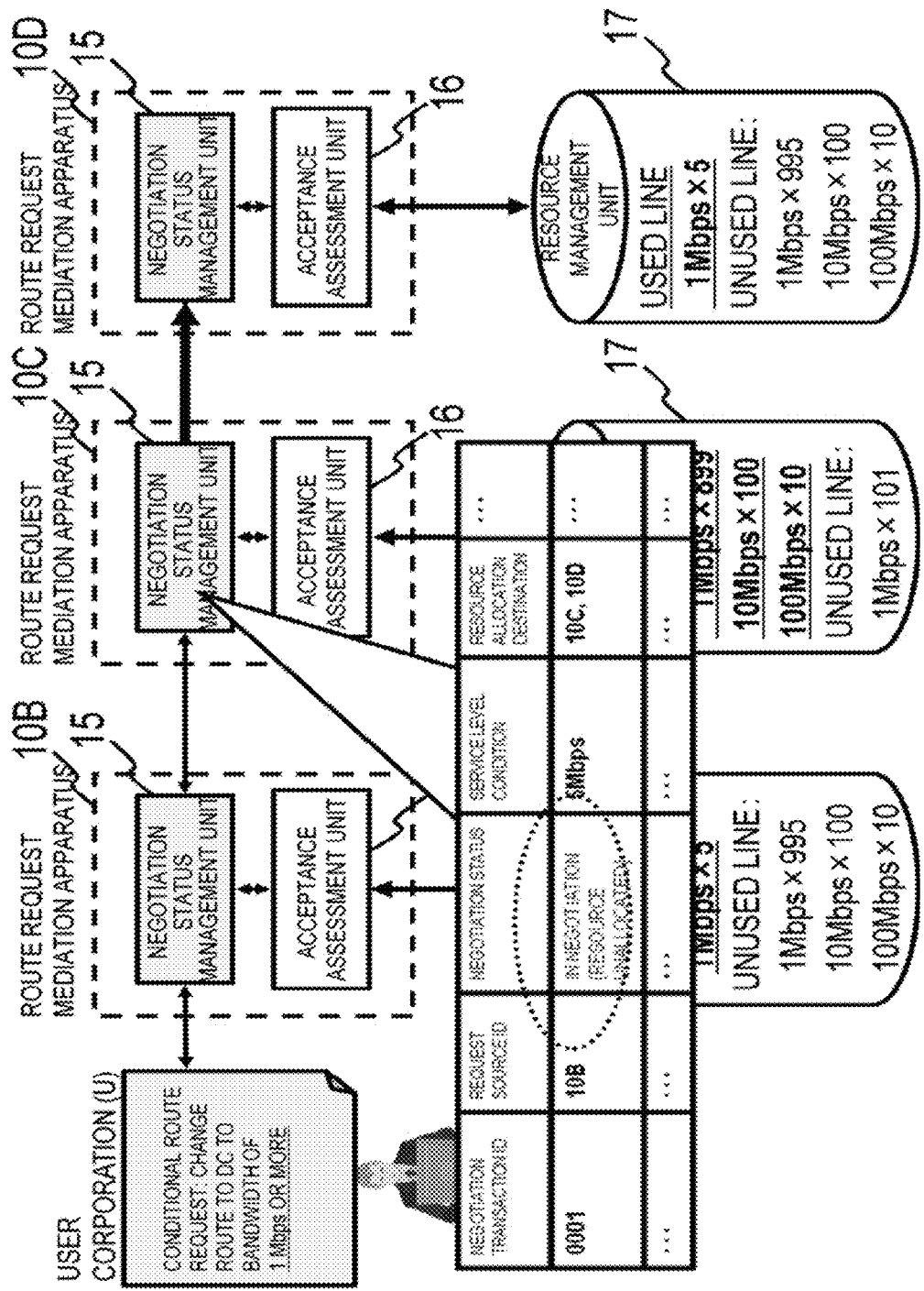
FIG. 19 is a drawing showing the operation of the route request mediation apparatus of the first exemplary embodiment of the present disclosure.

FIG. 19 is a drawing showing a state (9-4) in which the route request mediation apparatus 10C receives the route request with the requested bandwidth degraded to 1 Mbps. Having received the route request with the requested bandwidth degraded to 1 Mbps, the route request mediation apparatus 10C changes the negotiation status of the record having the transaction ID 0001 to "resource release pending" and transmits the route request with the requested bandwidth degraded to 1 Mbps to the route request mediation apparatus 10D. Further, the negotiation status management unit 15 of the route request mediation apparatus 10B notifies the acceptance assessment unit 16 that the difference of 4 Mbps is in a resource release pending state in which the resource can be released anytime. As a result, 4 Mbps on the line of the resource management unit 17 of the route request mediation apparatus 10D gets into a release pending state.

FIG. 20 is a drawing showing a state (9-5) in which the route request with the requested bandwidth degraded to 1 Mbps reaches the route request mediation apparatus 10D. The route request mediation apparatus 10D asks the acceptance assessment unit 16 if the request can be accepted since the resource allocation destination is in its own network. Here, the acceptance assessment unit 16 of the route request mediation apparatus 10D replies that the bandwidth for the route request can be changed because 5 Mbps have been already allocated. Upon receiving this response, the negotiation status management unit 15 of the route request mediation apparatus 10D changes the service level condition of the record having the transaction ID 0001 to 1 Mbps and requests the acceptance assessment unit 16 to release 4 Mbps. As a result, the bandwidth in use on the line of the resource management unit 17 of the route request mediation apparatus 10D is 1 Mbps and the rest is unused. Further, the negotiation status management unit 15 of the route request mediation apparatus 10D transmits a positive response to the requested bandwidth of 1 Mbps to the route request mediation apparatus 10C. Similarly, the negotiation status management units 15 of the route request mediation apparatuses 10C and 10B change the service level condition of the record having the transaction ID 0001 to 1 Mbps and requests the acceptance assessment unit 16 to release 4 Mbps. As a result, the bandwidths in use on the lines of the resource management units 17 of the route request mediation apparatuses 10B and 10C are 1 Mbps and the rest is released. This somewhat mitigates the overstrained state of the line of the route request mediation apparatus 10C.

As described, according to the present exemplary embodiment, it becomes possible to effectively utilize limited resources under detailed status management. Further, in (9-1) to (9-5) above, the explanation was made using the example in which the route request with the requested bandwidth degraded to 1 Mbps is transmitted, however, a resource negotiation is carried out following the above procedures (1) to (3) even when a route request with the requested bandwidth increased to more than the allocated 5 Mbps, for instance, to 7 Mbps is transmitted. As a result, if the requested bandwidth of 7 Mbps can be allocated in the route request mediation apparatus 10D, the negotiation will be settled as in the state (8) in FIG. 15. If the requested bandwidth of 7 Mbps cannot be allocated, a negative response will be sent back as in the states (4) to (6) in FIGS. 11 to 13. Meanwhile, the allocated 5 Mbps are maintained.

An exemplary embodiment of the present disclosure has been described above, however, the present disclosure is not limited to the exemplary embodiment described and further modifications, substitutions, and adjustments can be added within the scope of the basic technological concept of the present disclosure. For instance, the number and the connection relationship of the route request mediation apparatuses in the exemplary embodiment described above are merely an example and are not limited thereto.

Further, the sequence described in the exemplary embodiment above is a simplified example for explaining the principles of the present disclosure, and various modifications can be added. For instance, in the exemplary embodiment above, a response is returned based on the result of an inquiry to the accumulation unit of a route request mediation apparatus, however, each route request mediation apparatus may add a resource in a sleep mode or a process in which the route request mediation apparatuses work together may be added.

Further, in the exemplary embodiment above, a route to a bandwidth is requested, however, the present disclosure can be applied to cases where a route to other resources such as storage capacity of a data center that a user wants to use and the number of virtual machines are requested. Further, a route request requesting the allocation of a plurality of resource types can be addressed.

Further, each disclosure of Patent Literature and Non-Patent Literatures listed above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, the ranges of the numerical values used in the present document should be interpreted as a specific numeric value or small range included in the ranges even in cases where it is not stated so.

REFERENCE SIGNS LIST 10, 10A to 10D: route request mediation apparatus
11: input unit
12: display apparatus
13-1, 13-2: request receiving unit
14-1, 14-2: response sending unit
15: negotiation status management unit
16: acceptance assessment unit
17: resource management unit

What is claimed is:

1. A route request mediation apparatus, comprising:
a resource management unit that manages a resource of a network to be managed;
a request receiving unit that receives a route request with an added service level condition from a user or another route request mediation apparatus;
a negotiation status management unit that forwards said route request to a destination specified by said route request, and manages a negotiation status based on a response from said destination;
an acceptance assessment unit that assesses whether or not to accept said route request by referring to said negotiation status managed by said negotiation status management unit and to said resource management unit; and
a response sending unit that responds with an assessment result indicating whether or not said route request is accepted to the request source of said route request,
wherein, when receiving a response partially accepting a service level added to said route request as a response from said destination of said route request, said negotiation status management unit forwards said response including said service level indicated by said response to said user or another route request mediation apparatus, and receives a re-request for said response including said service level from said user or another apparatus.

2. The route request mediation apparatus according to claim 1, wherein, when receiving a response partially accepting a service level added to said route request as a response from said destination of said route request, said negotiation status management unit reserves a resource that corresponds to a service level indicated by said response from said destination of said route request.

3. The route request mediation apparatus according to claim 1, wherein when receiving a new route request from said request receiving unit, said negotiation status management unit issues a transaction ID and manages the negotiation status between the route request source and the route request destination using said transaction ID.

4. The route request mediation apparatus according to claim 1, wherein said negotiation status management unit manages the negotiation status between the route request source and the route request destination using statuses including at least two following statuses: a resource allocation pending status in which a predetermined resource is reserved and a resource release pending status in which the release of an allocated resource is possible.

5. A control apparatus realizing a route request accepted by the route request mediation apparatus according to claim 1 by controlling a switch in a network.

6. The route request mediation apparatus according to claim 1, wherein, when receiving a new route request from said request receiving unit, said negotiation status management unit issues a transaction ID and manages the negotiation status between the route request source and the route request destination using said transaction ID.

7. The route request mediation apparatus according to claim 2, wherein, when receiving a new route request from said request receiving unit, said negotiation status management unit issues a transaction ID and manages the negotiation status between the route request source and the route request destination using said transaction ID.

8. The route request mediation apparatus according to claim 1, wherein said negotiation status management unit manages the negotiation status between the route request source and the route request destination using statuses including at least two following statuses: a resource allocation pending status in which a predetermined resource is reserved and a resource release pending status in which the release of an allocated resource is possible.

9. The route request mediation apparatus according to claim 2, wherein said negotiation status management unit manages the negotiation status between the route request source and the route request destination using statuses including at least two following statuses: a resource allocation pending status in which a predetermined resource is reserved and a resource release pending status in which the release of an allocated resource is possible.

10. The route request mediation apparatus according to claim 3, wherein said negotiation status management unit manages the negotiation status between the route request source and the route request destination using statuses including at least two following statuses: a resource allocation pending status in which a predetermined resource is reserved and a resource release pending status in which the release of an allocated resource is possible.

11. A control apparatus realizing a route request accepted by the route request mediation apparatus according to claim 2 by controlling a switch in a network.

12. A control apparatus realizing a route request accepted by the route request mediation apparatus according to claim 3 by controlling a switch in a network.

13. A control apparatus realizing a route request accepted by the route request mediation apparatus according to claim 4 by controlling a switch in a network.

14. A route request mediation method performed by a route request mediation apparatus comprising a resource management unit that manages a resource of a network to be managed, said route request mediation method including:
  receiving a route request with an added service level condition from a user or another route request mediation apparatus;
  forwarding said route request to a destination specified by said route request, and managing a negotiation status based on a response from said destination;
  assessing whether or not to accept said route request by referring to said negotiation status managed by said negotiation status management unit and to said resource management unit; and
  responding with an assessment result indicating whether or not said route request is accepted to the request source of said route request,
  wherein said forwarding said route request to said destination specified by said route request comprises:
    when receiving a response partially accepting a service level added to said route request as a response from said destination of said route request, forwarding said response including said service level indicated by said response to said user or another route request mediation apparatus, and receiving a re-request for said response including said service level from said user or another apparatus.

15. A non-transient computer-readable storage medium that records a program having a computer that constitutes a route request mediation apparatus comprising a resource management unit that manages a resource of a network to be managed execute:
  a process of receiving a route request with an added service level condition from a user or another route request mediation apparatus;
  a process of forwarding said route request to a destination specified by said route request, and managing a negotiation status based on a response from said destination;
  a process of assessing whether or not to accept said route request by referring to said negotiation status managed by said negotiation status management unit and to said resource management unit; and
  a process of responding with an assessment result indicating whether or not said route request is accepted to the request source of said route request,
  wherein, when receiving a response partially accepting a service level added to said route request as a response from said destination of said route request, said process of forwarding said route request to said destination specified by said route request forwards said response including said service level indicated by said response to said user or another route request mediation apparatus, and receives a re-request for said response including said service level from said user or another apparatus.

* * * * *